(12) United States Patent
Bezirganyan et al.

(10) Patent No.: US 10,859,852 B2
(45) Date of Patent: Dec. 8, 2020

(54) REAL-TIME VIDEO PROCESSING FOR PYRAMID HOLOGRAPHIC PROJECTIONS

(71) Applicant: VENTANA 3D, LLC, Van Nuys, CA (US)

(72) Inventors: Hayk Bezirganyan, Burbank, CA (US); Ashley Crowder, Culver City, CA (US); Benjamin Conway, Anaheim Hills, CA (US); Hoang Son Vu, Winnetka, CA (US); Michael James Borke, Santa Clara, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 94 days.

(21) Appl. No.: 16/290,664

(22) Filed: Mar. 1, 2019

(65) Prior Publication Data

US 2019/0271943 A1    Sep. 5, 2019

Related U.S. Application Data

(60) Provisional application No. 62/636,988, filed on Mar. 1, 2018.

(51) Int. Cl.
| | |
|---|---|
| *G02B 30/56* | (2020.01) |
| *H04N 9/31* | (2006.01) |
| *H04N 13/302* | (2018.01) |
| *G02B 27/01* | (2006.01) |
| *G03H 1/22* | (2006.01) |

(52) U.S. Cl.
CPC ......... *G02B 30/56* (2020.01); *G02B 27/0103* (2013.01); *H04N 9/3179* (2013.01); *H04N 13/302* (2018.05); *G02B 2027/014* (2013.01); *G03H 1/2249* (2013.01)

(58) Field of Classification Search
CPC .. G02B 30/56; G02B 27/0103; H04N 9/3179; H04N 13/302
See application file for complete search history.

(56) References Cited

U.S. PATENT DOCUMENTS

| | | | |
|---|---|---|---|
| 2017/0322513 A1* | 11/2017 | Zapanta | G02B 30/56 |
| 2019/0235375 A1* | 8/2019 | Martinez | G03B 21/62 |

\* cited by examiner

*Primary Examiner* — Ryan D Howard
(74) *Attorney, Agent, or Firm* — Behmke Innovation Group LLC; James M. Behmke; Jonathon P. Western

(57) ABSTRACT

Various techniques are described herein that provide for a real-time image or video processing system that is able to capture and stream or record/store video content of an object, and turn the captured content into a new video format that can be properly projected onto a pyramid holographic projector. In one specific embodiment, the techniques herein capture a video selfie of a user and stream it live or else store it for playback later as a saved message. Other embodiments, such as controlled avatars, animated characters, etc., may also be converted from a standard 2D format into a pyramid hologram format, either in real-time or else during post-processing, accordingly.

20 Claims, 27 Drawing Sheets

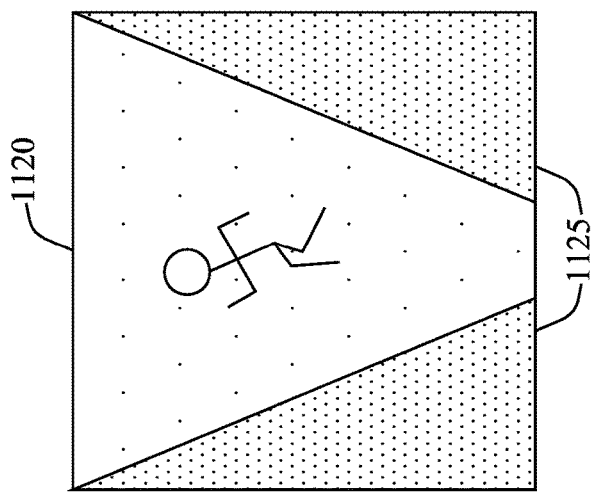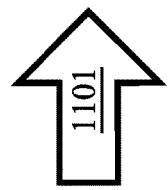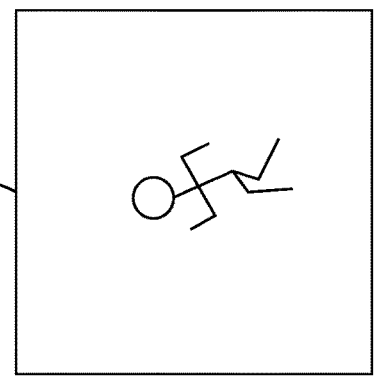
FIG. 11A

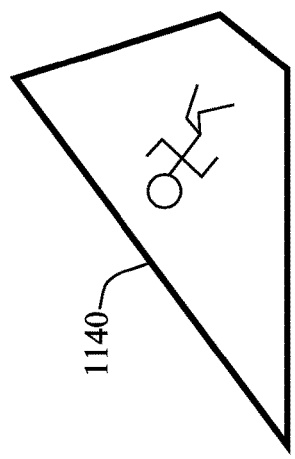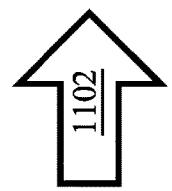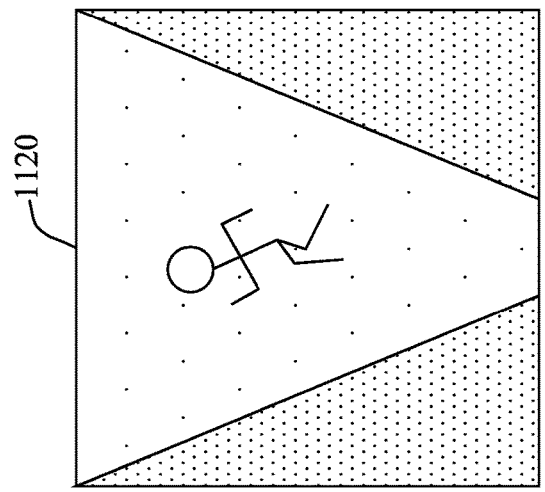
FIG. 11C

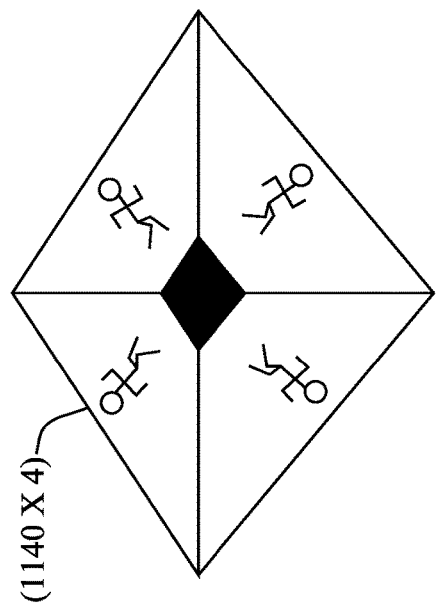
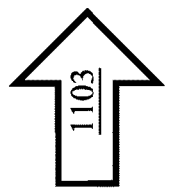
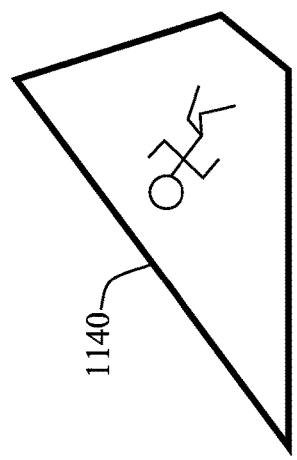
FIG. 11D

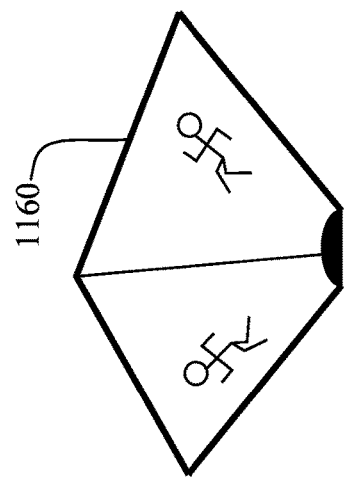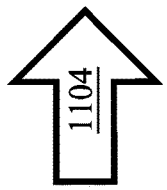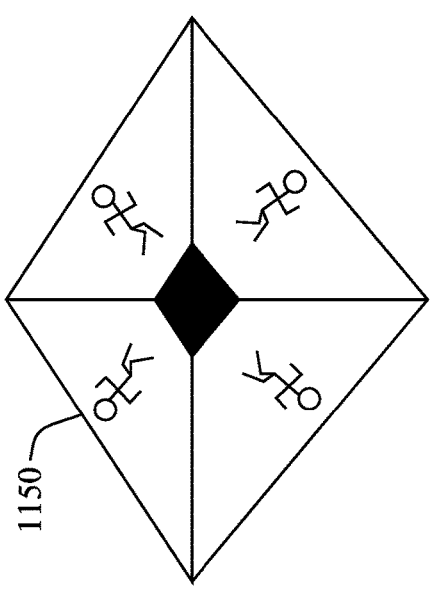
FIG. 11E

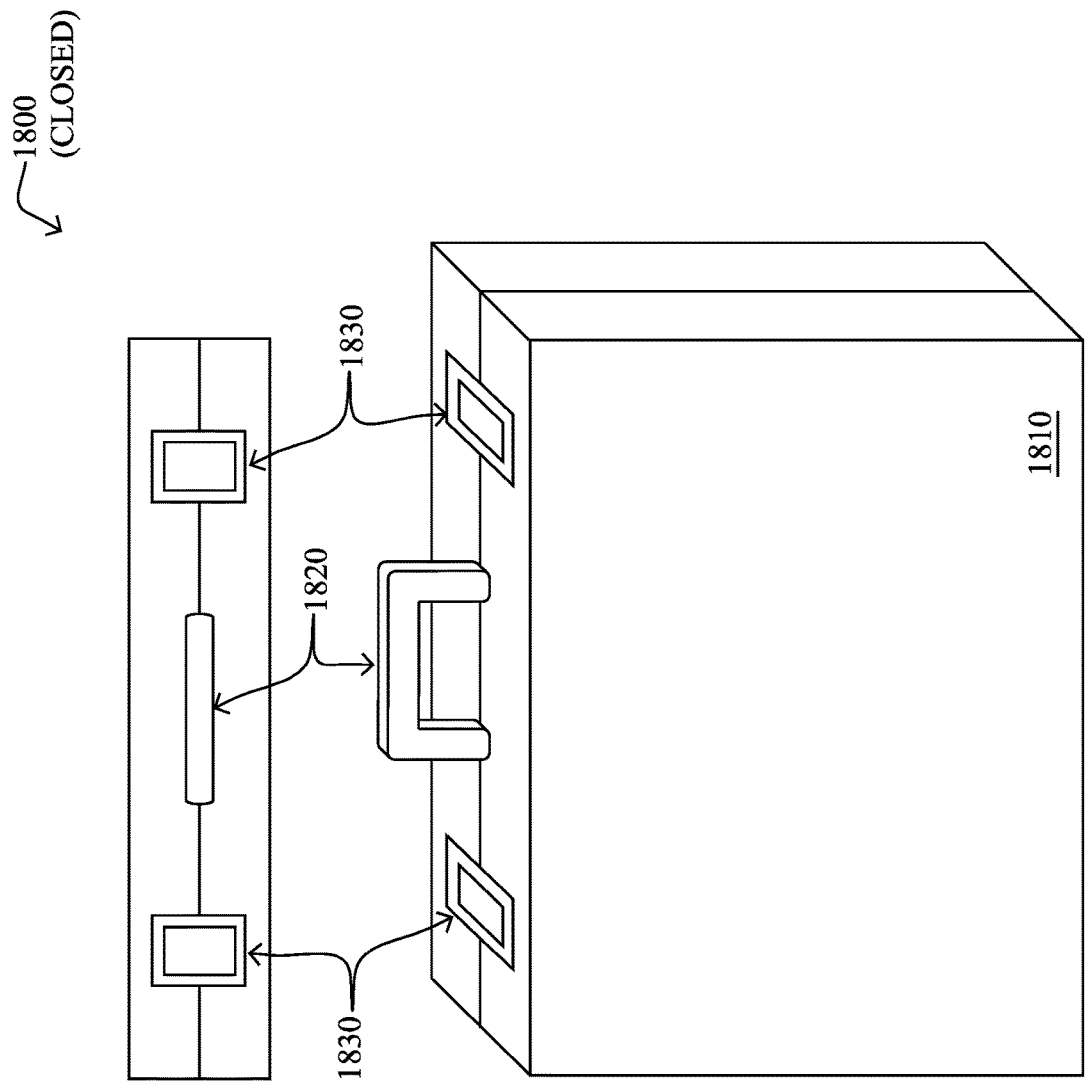
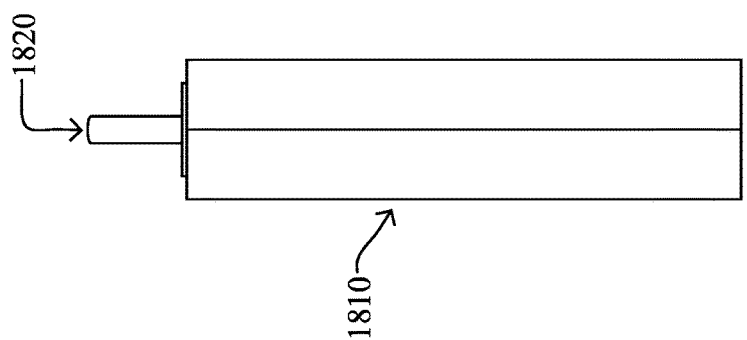
FIG. 18

REAL-TIME VIDEO PROCESSING FOR PYRAMID HOLOGRAPHIC PROJECTIONS

RELATED APPLICATION

This application claims priority to U.S. Provisional Patent Application No. 62/636,988, filed Mar. 1, 2018, entitled REAL-TIME VIDEO PROCESSING FOR PYRAMID HOLOGRAPHIC PROJECTIONS, by Bezirganyan et al., the contents of which are hereby incorporated by reference in their entirety.

TECHNICAL FIELD

The present disclosure relates generally to video processing, and, more particularly, to real-time video processing for pyramid holographic projections.

BACKGROUND

Since around 2010, hollow pyramid-shaped prisms have been placed over a flat screen (or smartphone) by consumers to emulate a three-dimensional (3D) image by means of two-dimensional (2D) light refraction. For instance, early stage crafters would use various sources of plastic (e.g., a plastic CD cover) cut and assembled into a pyramid shape to turn their smartphones into hologram projectors. Such hologram projectors (also known as a "holography pyramid" or "holography display") make the holographic 3D projection possible based on a concept called the "Pepper's Ghost Illusion", which is an illusion technique where a picture of an object or person is displayed on a flat surface (also referred to as a "bounce"), which is at an approximate 45-degree angle to a transparent screen surface. The pyramid hologram projector, therefore, acts as the transparent screen surface in multiple (e.g., four) directions, and multiple (e.g., four) images are displayed for reflection by the transparent surfaces of the pyramid to be viewed from respective directions, accordingly.

Though there are various simplified videos available online today that can take advantage of this technology (e.g., butterflies, fireworks, etc.), the processing of these "pyramid hologram" demonstration videos has been time-consuming and performed offline by skilled graphic artists.

SUMMARY

According to embodiments herein, various techniques provide for a real-time image or video processing system that is able to capture and stream or record/store video content of an object, and turn the captured content into a new video format that can be properly projected onto a pyramid holographic projector. In one specific embodiment, the techniques herein capture a video selfie of a user and stream it live or else store it for playback later as a saved message. Other embodiments, such as controlled avatars, animated characters, etc., may also be converted from a standard 2D format into a pyramid hologram format, either in real-time or else during post-processing, accordingly.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 11A-11E illustrate an example of real-time video processing for pyramid holographic projections;

FIG. 18 illustrates an example closed travel case;

DESCRIPTION OF EXAMPLE EMBODIMENTS

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

Figure 1:
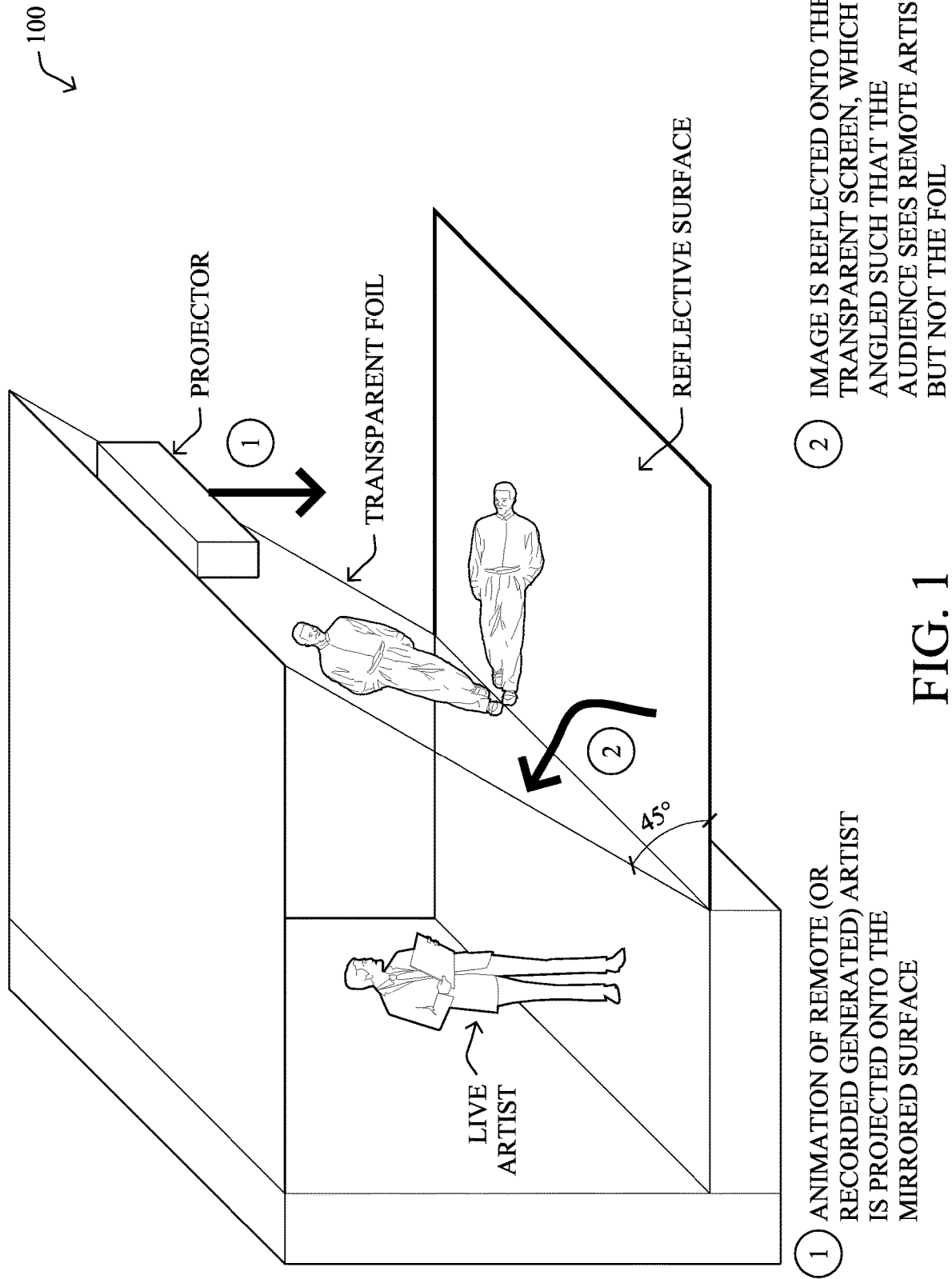
FIG. 1 illustrates an example of well-known holographic projection techniques.

FIG. 1 illustrates an example of a conventional (generally large-scale) holographic projection system 100 (e.g., demonstrating a recent trend in live music performances using a holographic projection of a performer, such as a live-streamed, pre-recorded, or re-constructed performance). Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Figure 2:
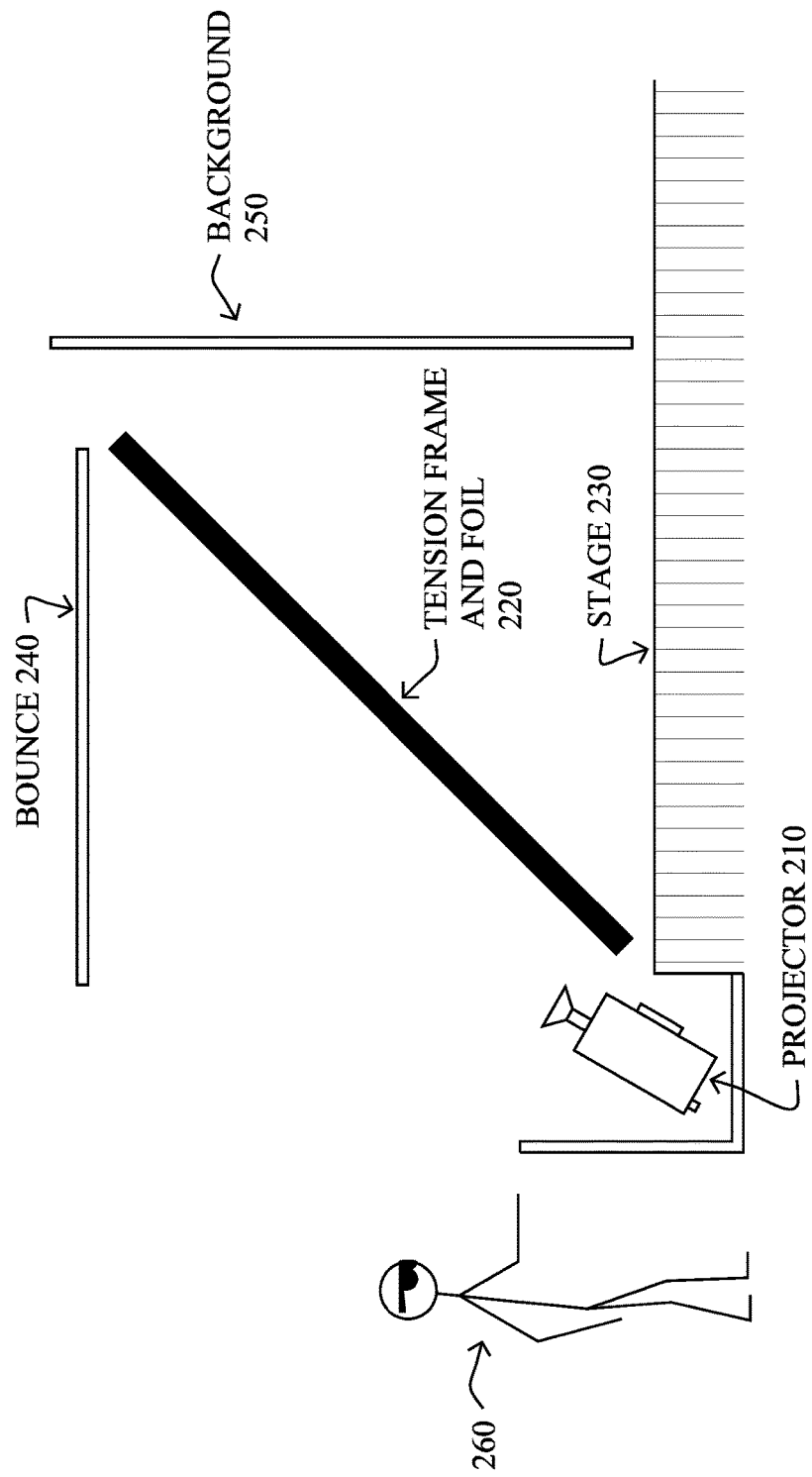
FIG. 2 illustrates an alternative arrangement for a projection-based holographic projection system, namely where the projector is located on the floor, and the bounce is located on the ceiling.

FIG. 2 illustrates an alternative arrangement for a projection-based holographic projection system, namely where the projector 210 is located on the floor, and the bounce 240 is located on the ceiling. The stick figure illustrates the viewer 260, that is, from which side one can see the holographic projection. In this arrangement, the same effect can be achieved as in FIG. 1, though there are various considerations as to whether to use a particular location of the projector 210 as in FIG. 1 or FIG. 2.

Though the projection-based system is suitable in many situations, particularly large-scale uses, there are certain issues with using projectors in this manner. For example, if atmosphere (e.g., smoke from a fog machine) is released, the viewer 260 can see where the light is coming from, thus ruining the effect. Also, projectors are not typically bright enough to shine through atmosphere, which causes the reflected image to look dull and ghost-like. Moreover, projectors are large and heavy which leads to increased space requirements and difficulty rigging.

Figure 3:
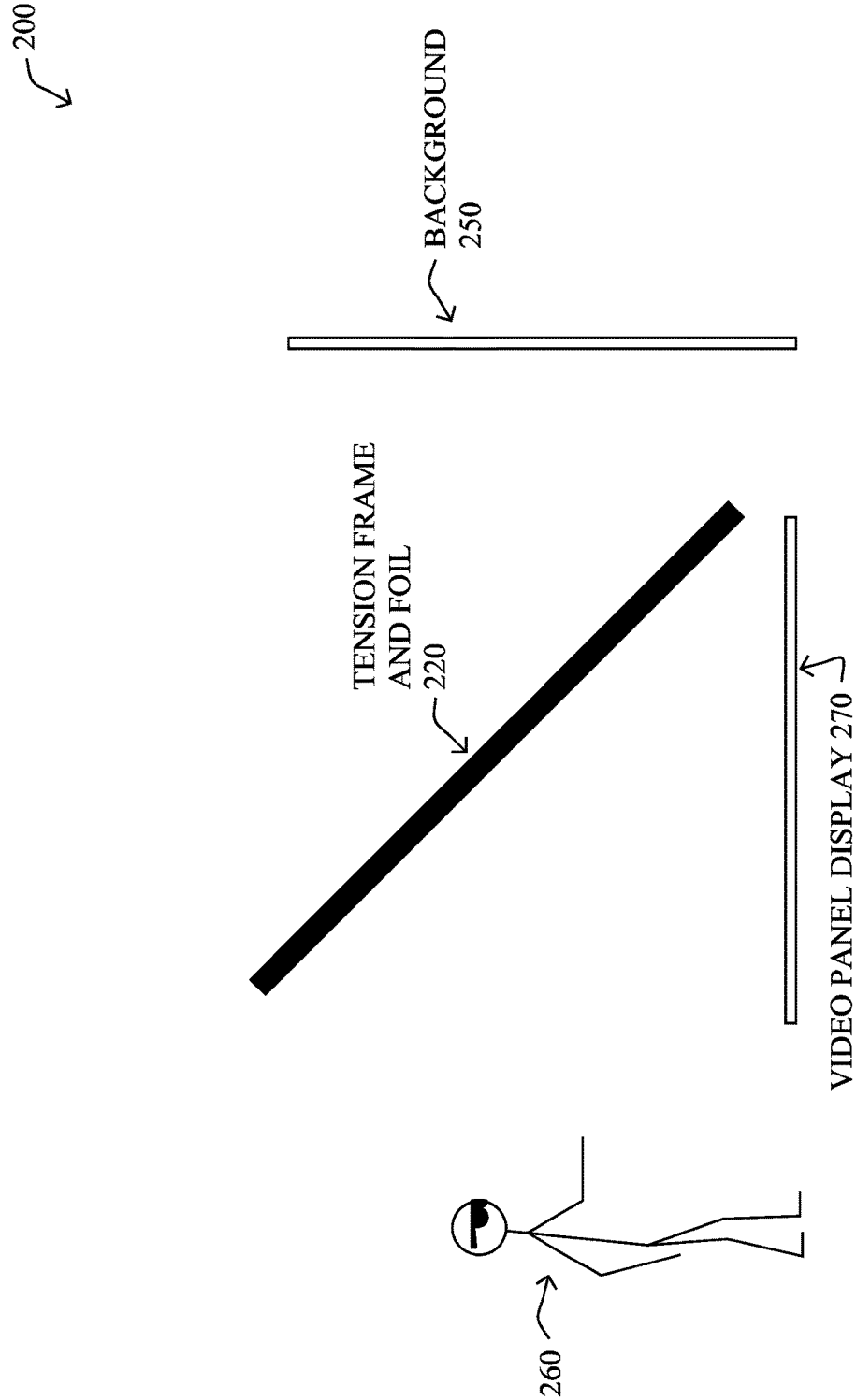
FIG. 3 illustrates an example of a holographic projection system using video panel displays, with the panel below a transparent screen.
Figure 4:
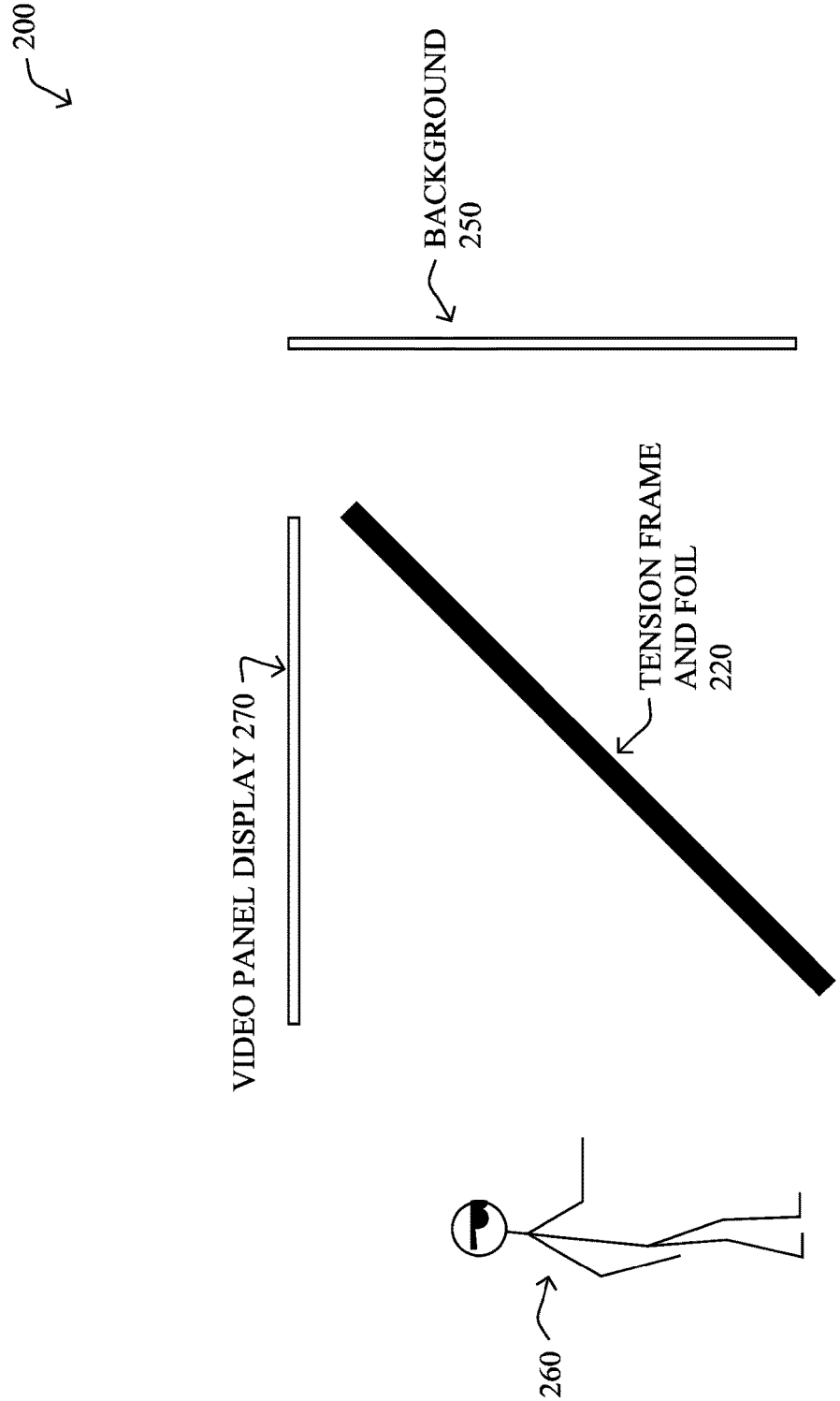
FIG. 4 illustrates an example of a holographic projection system using video panel displays, with the panel above a transparent screen.

Another example holographic projection system, therefore, with reference generally to FIGS. 3 and 4, may be established with video panel displays 270, such as LED or LCD panels, mobile phones, tablets, laptops, or monitors as the light source, rather than a projection-based system. In particular, these panel-based systems allow for holographic projection for any size setup, such as from personal "mini" displays (e.g., phones, tablets, etc.) up to the larger full-stage-size displays (e.g., with custom-sized LCD or LED panels). Similar to the typical arrangement, a preferred angle between the image light source and the reflective yet transparent surface (clear screen) is an approximate 45-degree angle, whether the display is placed below the transparent screen (FIG. 3) or above it (FIG. 4).

Again, the stick figure illustrates the viewer 260, that is, from which side one can see the holographic projection. Note that the system typically provides about 165-degrees of viewing angle. (Also note that various dressings and props can be designed to hide various hardware components and/or to build an overall scene, but such items are omitted for clarity.)

The transparent screen is generally a flat surface that has similar light properties of clear glass (e.g., glass, plastic such as Plexiglas or tensioned plastic film). As shown, a tensioning frame 220 is used to stretch a clear foil into a stable, wrinkle-free (e.g., and vibration resistant) reflectively transparent surface (that is, displaying/reflecting light images for the holographic projection, but allowing the viewer to see through to the background). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, a tablet, a mobile phone, etc. A variety of sizes can be used. When an image (e.g., stationary or moving) is shown on the video panel display 270, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion. However, different from the original Pepper's Ghost Illusions using live actors/objects, and different from projector-based holographic systems, the use of video panel displays reduces or eliminates the "light beam" effect through atmosphere (e.g., fog), allowing for a clearer and un-tainted visual effect of the holographic projection. (Note that various diffusion layers may be used to reduce visual effects created by using video panel displays, such as the Moiré effect.) Also, using a video panel display 270 may help hide projector apparatus, and may reduce the overall size of the holographic system.

Additionally, some video panels such as LED walls are able to generate a much brighter image than projectors are able to generate thus allowing the Pepper's Ghost Illusion to remain effective even in bright lighting conditions (which generally degrade the image quality). The brighter image generated from an LED wall also allows for objects behind the foil to be more well-lit than they can be when using projection. Moreover, by displaying an image of an object or person with a black background on the light source, it is reflected onto the transparent flat surface so it looks like the object or person is floating or standing on its own.

In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music may be streamed directly from the soundboard of the broadcast venue and sent to state-of-the-art sound systems at the satellite venues, where light shows may accompany the performance with top of the line LED screens and lasers.

Figure 5:
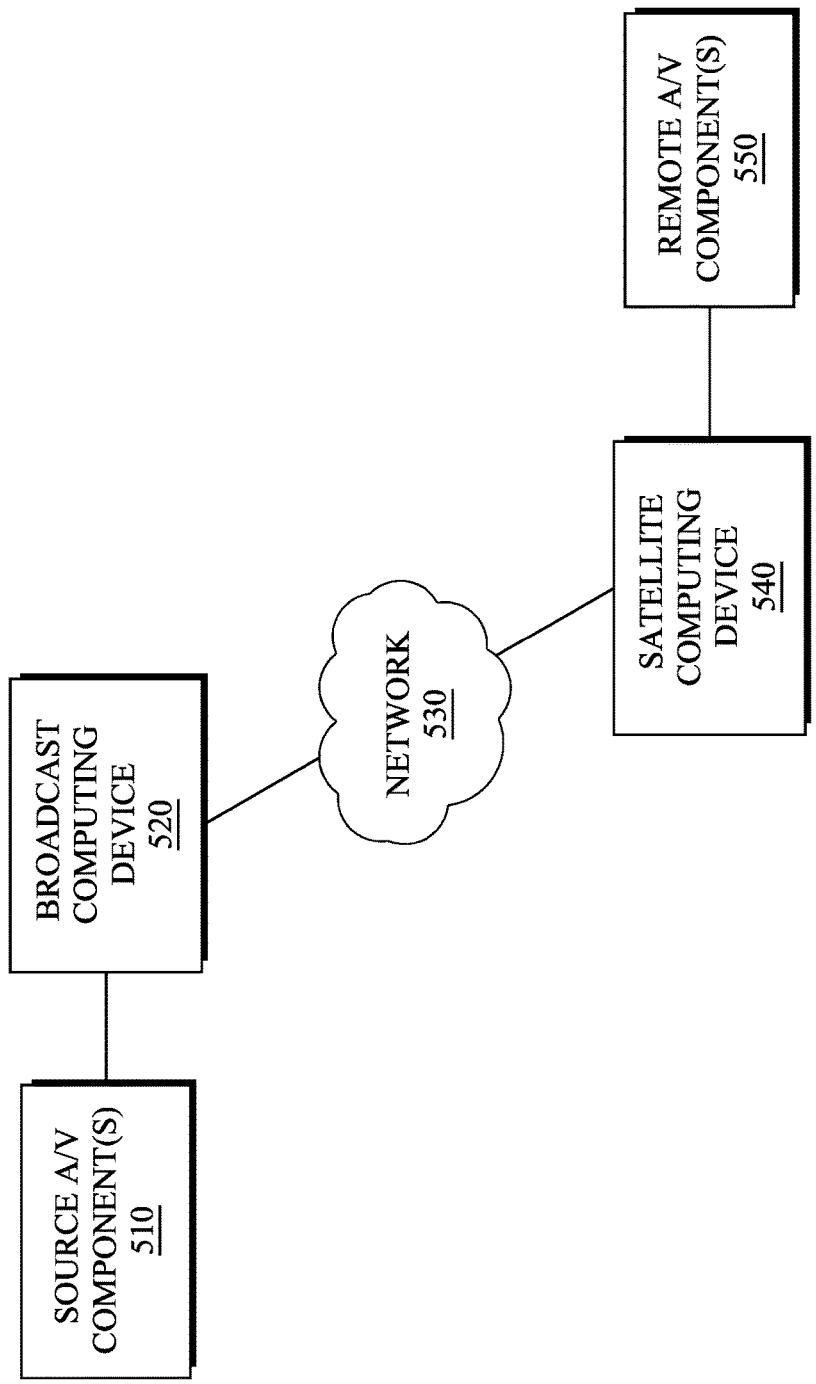
FIG. 5 illustrates an example simplified holographic projection system (e.g., communication network)

For instance, FIG. 5 illustrates an example simplified holographic projection system (e.g., communication network), where the network 500 comprises one or more source A/V components 510, one or more "broadcast" computing devices 520 (e.g., a local computing device), a communication network 530 (e.g., the public Internet or other communication medium, such as private networks), one or more "satellite" computing devices 540 (e.g., a remote computing device), and one or more remote A/V components 550.

In the example above, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

As another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 6:
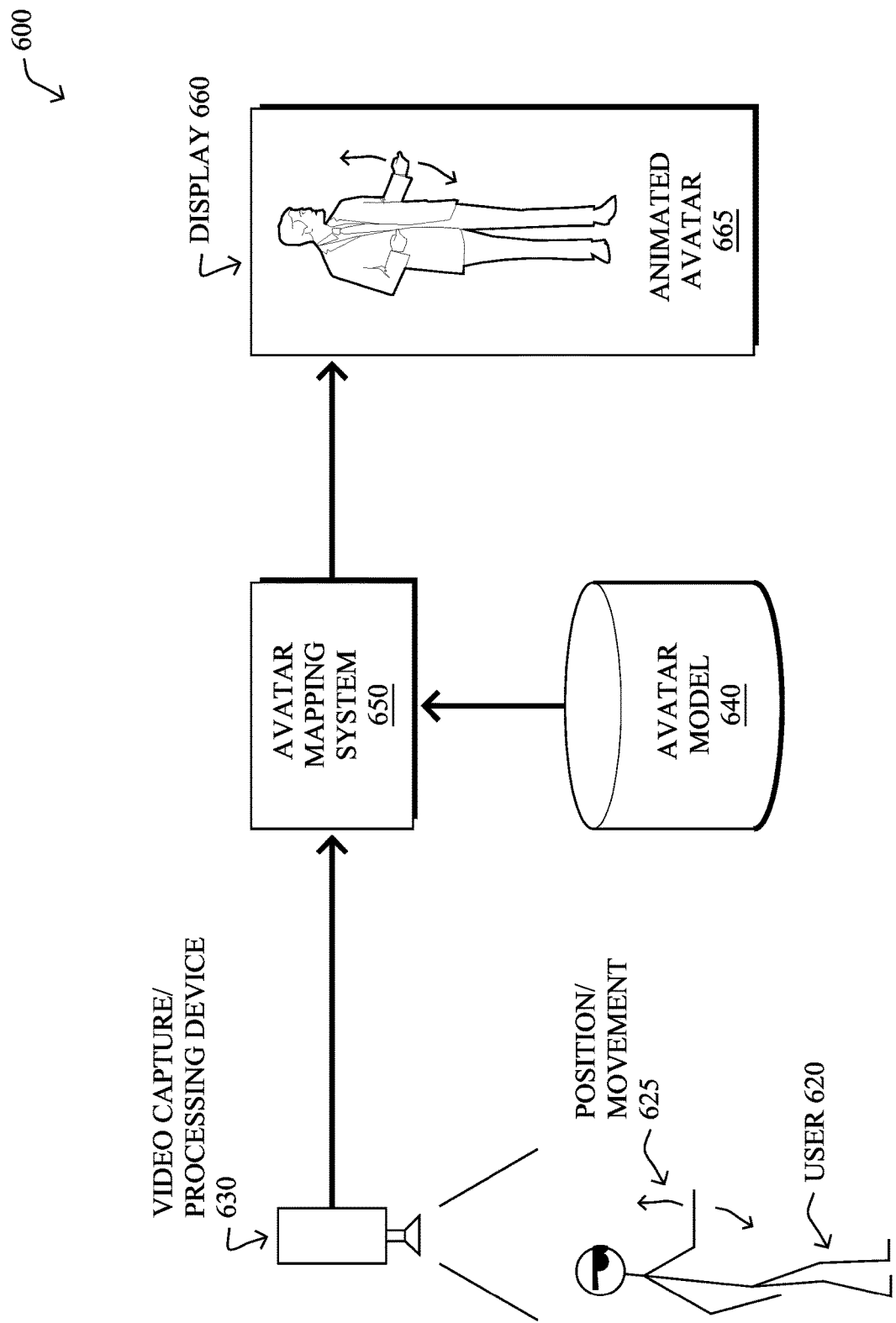
FIG. 6 illustrates a simplified example of an avatar control system.

FIG. 6 illustrates a simplified example of an avatar control system. In particular, as shown in the system 600, a video capture/processing device 610 is configured to capture video images of one or more objects, particularly including one or more users 620 that may have an associated position and/or movement 625. The captured video data may comprise color information, position/location information (e.g., depth information), which can be processed by various body tracking and/or skeletal tracking algorithms to detect the locations of various tracking points (e.g., bones, joints, etc.) of the user 620. An avatar mapping system 650 may be populated with an avatar model 640, such that through various mapping algorithms, the avatar mapping system is able to animate an avatar 665 on a display 660 as controlled by the user 620. Illustratively, in accordance with the techniques herein the display 660 may comprise a holographic projection of the model animated avatar 665, e.g., allowing an individual to interactively control a holographic projection of a character. (Notably, the avatar mapping system 650 may provide its control functionality in real-time or as a recorded/post-production video feed, and may be co-located with the video processing system 630, remotely located from the video processing system, or as divided components allowing it to be both local to and remote from the video processing system.)

—Pyramid Holographic Projections—

As noted above, pyramid-shaped prisms can be placed over a flat screen (such as a tablet or smartphone) by consumers to emulate a 3D image by means of 2D light refraction. Such hologram projectors (also known as a "holography pyramid" or "holography display") make the holographic 3D projection possible based on the "Pepper's Ghost Illusion".

Figure 7A:
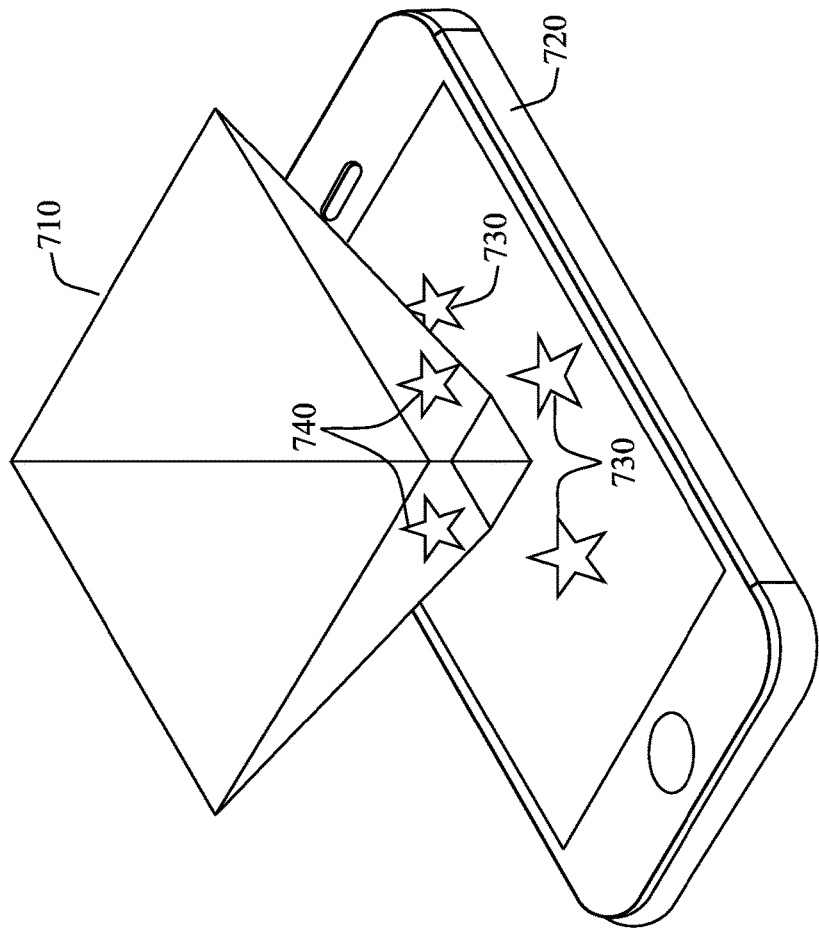
FIGS. 7A-7B illustrate an example of pyramid holographic projections.
Figure 7B:
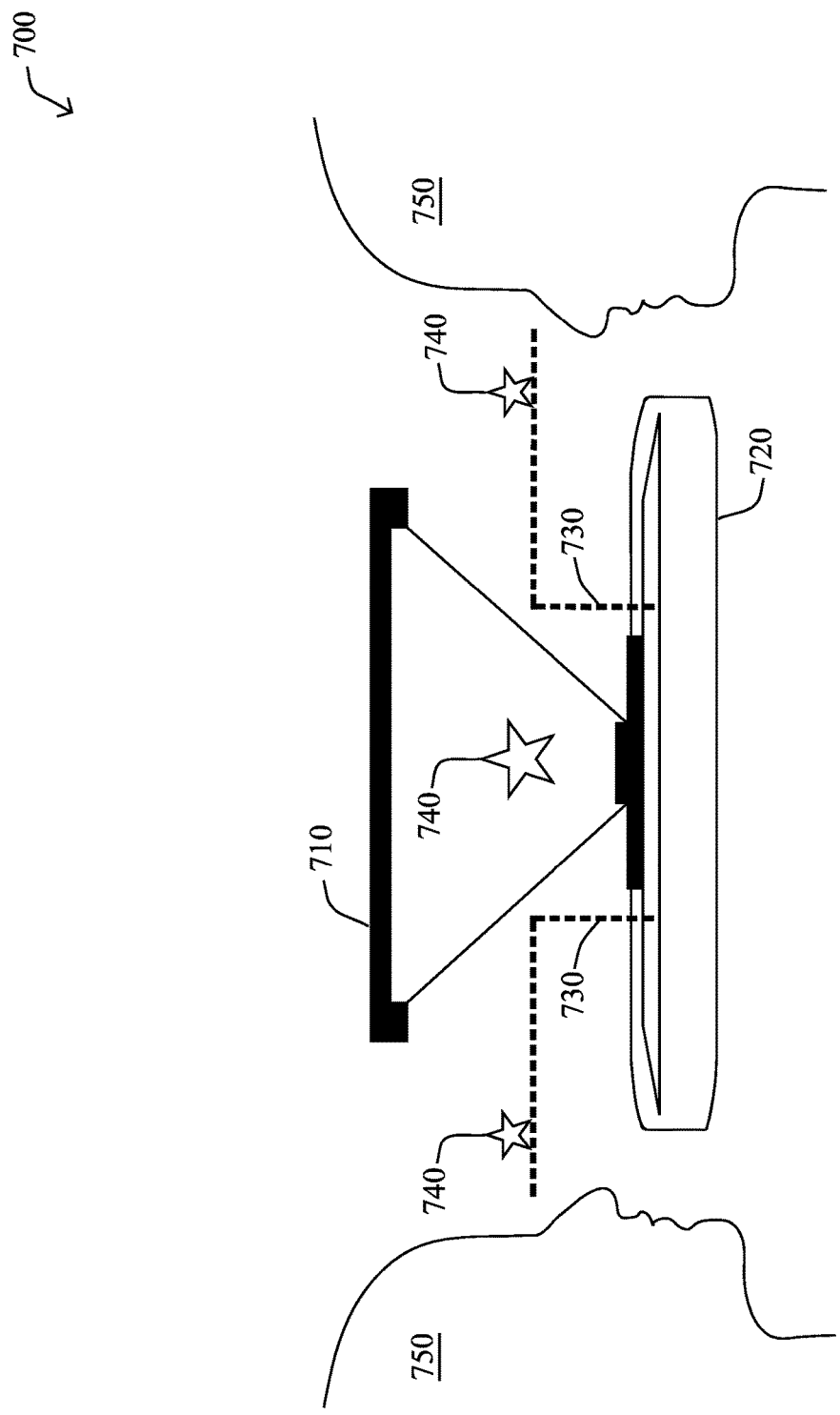

FIG. 7A illustrates an example pyramid holographic projection system 700 that may be used in accordance with one or more embodiments herein. In particular, each flat surface of the pyramid hologram projector 710 acts as a transparent screen surface in a respective direction (e.g., four, as shown, though three or more than four may also be used with similarly corresponding images), and is placed on the surface of an image display device 720 (e.g., smartphone). Images 730 may then be displayed for reflection as holographic projection 740 by each of transparent surfaces of the pyramid, and, as shown in FIG. 7B, to be viewed by users 750 from respective directions, accordingly. (Note that while the same image 730 may be copied for each of the plurality images shown, other embodiments may display different images, such as described below.)

Figure 8:
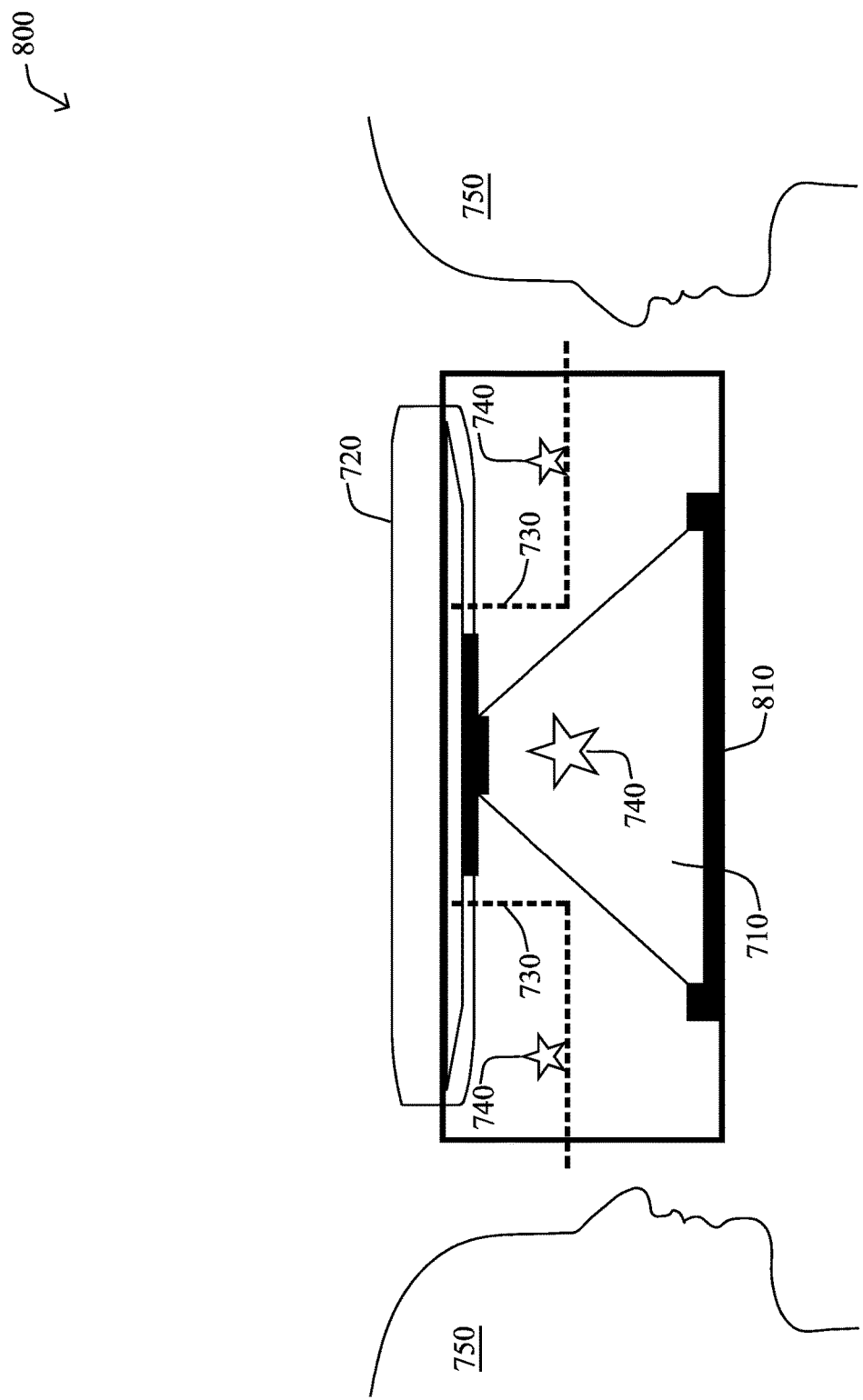
FIG. 8 illustrates an example of an alternative configuration of pyramid holographic projections.

Additionally, as shown in FIG. 8, an alternative system 800 may be embodied as a stand 810 holding the pyramid hologram projector 710 in a flipped orientation, where the image source (display device 720) may be supported from the top of the stand 810, as shown.

Figure 9:
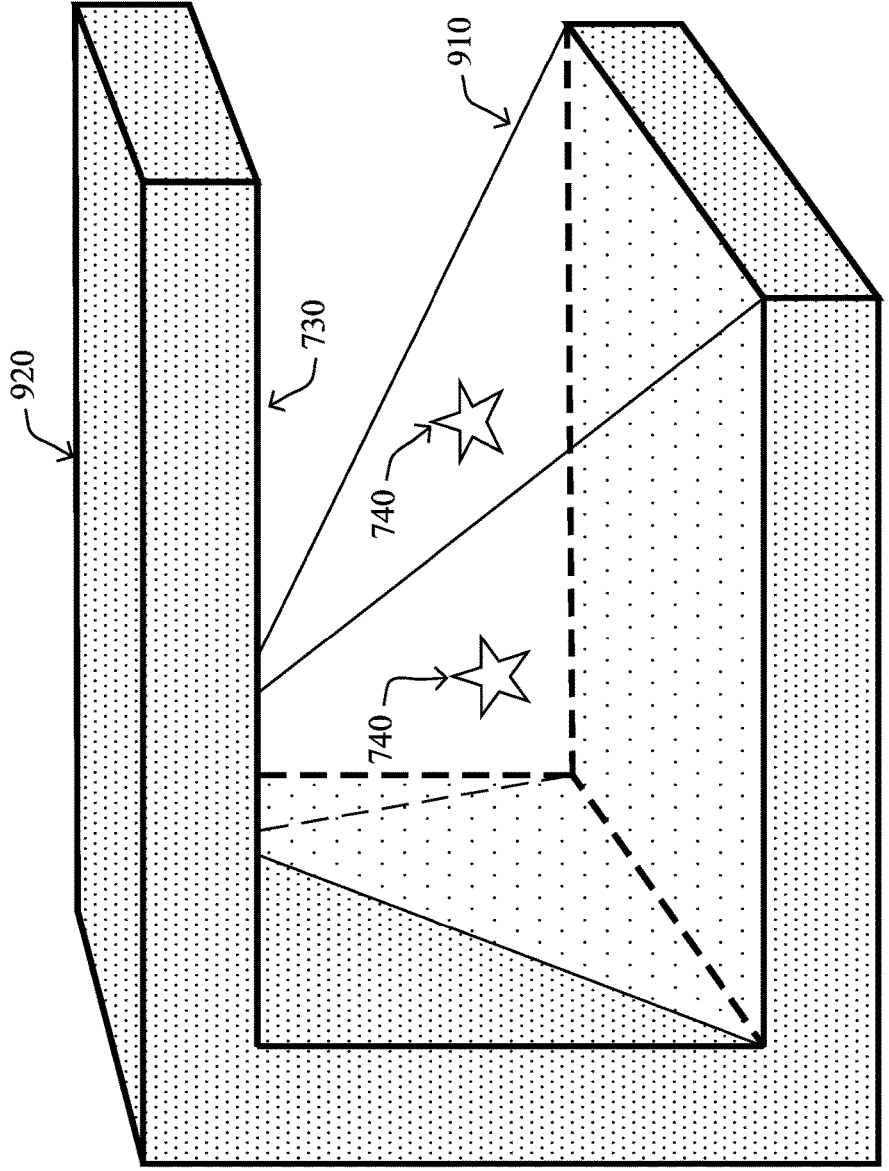
FIG. 9 illustrates an example of another alternative configuration of pyramid holographic projections.

It should be specifically noted that while the embodiments shown in FIGS. 7A-8 are based on an illustrative smartphone, any suitable display device, include both panel displays and projection displays, may be used with the techniques herein (e.g., depending on the size of the display). Also, while a four-sided pyramid is shown with equal sides, other arrangements of the pyramid may be used, such as a three-sided pyramid. Note further that not all sides need to be configured to display an image, such as the alternative embodiment 900 further shown in FIG. 9, where a three-sided pyramid (projector) 910 is shown within a stand 920 that does not have equally shaped sides (displaying images 730 for reflections/holographic projections 740), such as for displays up against a wall (e.g., a back of a display that is not meant for users to be behind).

Figure 10:
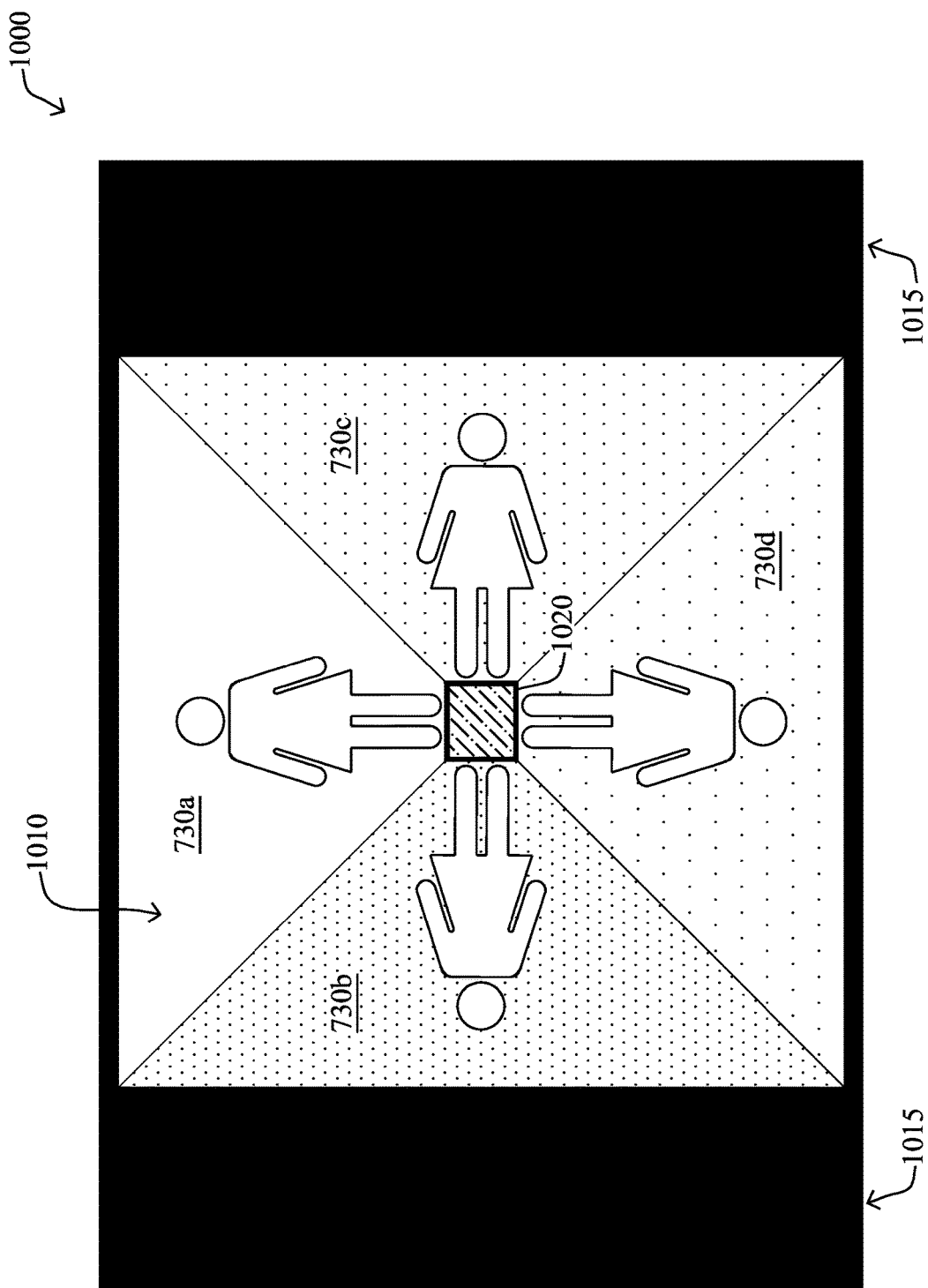
FIG. 10 illustrates an example of an image configuration for pyramid holographic projections.

Furthermore, FIG. 10 illustrates a corresponding display 1000 for image suite 1010, comprising each individual image 730 (e.g., 730a-730d, as shown). Note that the reference numbers 730a-740d do not specifically point to the illustrative female icon, but instead reference the entire corresponding portion of the image suite 1010, since the entire displayed area is the image 730. Typically, however, the icon or other object (e.g., a person) would be displayed in front of a black background, thus the only image reflected would be the object itself. In addition to the individual images 730, the image suite 1010 may also comprise a reference locator 1020, in order to ensure that a corresponding pyramid projector is places in the proper position and orientation for proper operation. As further demonstrated, since the aspect ratio of most displays are not square (e.g., 16:9), the full display 1000 may comprise one or more blackened areas 1015 to allow for symmetrical display of the images 730 (e.g., a 9:9 ratio for image suite 1010, with the additional portion(s) of the 16:9 aspect screen being blankly displayed).

As also mentioned above, though there are various simplified videos available online today that can take advantage of pyramid hologram technology, the processing of these images/videos has been time-consuming and performed offline by skilled graphic artists. The techniques herein, therefore, provide a real-time image or video processing system that is able to capture and stream or record/store video content of an object, and turn the captured content into a new video format that can be properly projected onto a pyramid holographic projector. In one specific embodiment, the techniques herein capture a video selfie of a user and stream it live or else store it for playback later as a saved message. Other embodiments, such as controlled avatars, animated characters, etc., may also be converted from a standard 2D format into a pyramid hologram format, either in real-time or else during post-processing, accordingly.

Operationally, the techniques herein take a video input and process it through a custom script (e.g., that runs on an FFMPEG framework) to convert that video into a pyramid holographic format. As mentioned, this conversion may be performed real-time or else post recording on a server.

FFMPEG (generally referring to a "fast forward" project based on the Moving Picture Experts Group (MPEG) international standard for encoding and compressing video images), as a particular illustrative example, is a software project that produces libraries and programs for handling multimedia data. The FFMPEG framework is based on a suite of open source software that permits managing of audio or video streams to make recordings, corrections with filters, and/or transcode media from one format to another (e.g., decode, encode, transcode, mux, demux, stream, filter, play, etc.).

The script running on the illustrative framework (e.g., FFMPEG or otherwise) can be based on a graphics engine such as the cross-platform Unity engine developed by Unity Technologies, as will be understood by those skilled in the art. Graphics engines, in particular, may be used to develop both three-dimensional and two-dimensional models and videos and simulations for computers, consoles, and mobile devices. Unity, for example, allows importation of sprites and an advanced 2D world renderer for 2D videos, while for 3D videos, it allows specification of texture compression, mipmaps, and resolution settings for each platform that the graphics engine supports, and provides support for bump mapping, reflection mapping, parallax mapping, screen space ambient occlusion (SSAO), dynamic shadows using shadow maps, render-to-texture, and full-screen post-processing effects. Unity also supports the creation of custom vertex, fragment (or pixel), tesselation, compute shaders, and surface shaders. Notably, graphics engines, such as Unity, also allow for the creation of scenes, which are a collection of objects typically operated on as a unit during execution of the video (e.g., where environments, obstacles, and decorations, can be defined).

According to the techniques herein, a graphics processing unit (GPU), especially with accelerated compression and compositing, can take a single image/video source, and can produce a pyramid holographic projection video source by optionally first copying the same image/video multiple times, and overlaying the final result on top of a transparent frame, positioning and rotating each image/video to form an "open box" shape that is centered in the frame.

With reference to the example 1100 of FIGS. 11A-11E, the techniques herein are configured to create a pyramid holographic projection in real time, using a GPU script such as within the illustrative software environments described above. For instance, as shown in step 1101 of FIG. 11A, an initial input image 1110 (e.g., a frame of a video or a still image) is captured (e.g., input from selfie camera, as described below), and then with a flat planar "UV map" (triangle 1120), only what is in the triangle will be rendered (i.e., not the removed portions 1125).

Notably, UV mapping is the 3D modeling process of projecting a 2D image (texture map) to a 3D model's surface for texture mapping (the letters "U" and "V" denote the axes of the 2D texture because "X", "Y", and "Z" are already used to denote the axes of the 3D object in model space). That is, UV texturing permits polygons that make up a 3D object to be painted with color (and other surface attributes) from an ordinary image, called a UV texture map. As will be appreciated by those skilled in the art, the UV mapping process involves assigning pixels in the image to surface mappings on the polygon, usually done by "programmatically" copying a triangular piece of the image map and pasting it onto a triangle on the object.

Figure 11B:
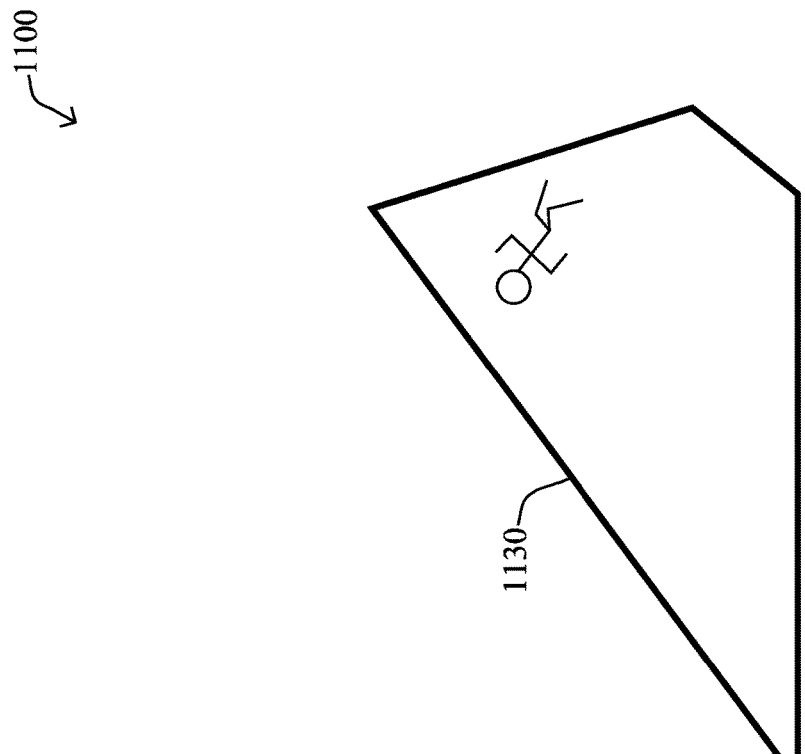

If only a square or rectangle (e.g., the original image 1110) were to be used, which has a "face UV map", the GPU would create the kind of distortion 1130 as shown in step 110X (not a step of the techniques herein) in FIG. 11B. However, according to the techniques herein, by using a trapezoid shape 1120 with a flat planar map, as shown in step 1102 of FIG. 11C the ultimate image 1140 (planar map applied to a trapezoid) thus avoids the distortions. (Note that the bottom left and right corners of the shape will remain invisible, i.e., the cut-out portions 1125 from FIG. 11A).

As shown in step 1103 of FIG. 11D, instead of using the rectangular shape for the video "quad", the techniques herein use the trapezoid shape image 1140 (which has a flat UV map), and copies the image to be projected on all sides of the pyramid (e.g., four sides) as final image 1150. Note that in accordance with one embodiment of the techniques herein, the original image may be a single image (e.g., from a single camera), and as such the image may be copied four times to be equally displayed on each of the four surfaces (of a four-surface pyramid). However, in other embodiments, multiple cameras may be used (e.g., four cameras: front, back, right side, left side), and as such, the copying of the image 1140 need not occur, however step 1103 would still stitch the multiple images from the multiple cameras together to create the final image 1150, accordingly. (Note further that the center of the image 1150 may be configured as the reference locator 1020 for the appropriate pyramid template, as mentioned above.)

The final result of step 1104 in FIG. 11E is an image or video stream as a pyramid holographic projection 1160, where the input image/video is converted and transformed in real time. In other words, the trapezoid can be used to create the pyramid shape with the same image projected. Other effects, such as customizing the aspect ratio size and additional content can also occur in either real-time or in post processing.

According to one or more specific embodiments of the present disclosure, the techniques above may be used with advanced "holographic selfie" technology, where the user is separated from the environment, and only the user (or other object) is recorded or streamed as a video. That is, as described below, pyramid calling or messaging (or other video streams) may be established by producing a holographic selfie video and converting it into the pyramid projection image in real-time as described above.

As one example, Chroma Keying or Chroma Key Compositing is generally a post-production technique of layering two film images together based on color. For example, as is well understood in the art, a person or object may be filmed in front of a "green screen" (though any color may be used), and the green color is replaced through software with another background image. One problem with such an approach, however, is that it requires a solid color background, where the person or object must be placed between a camera and the solid color in order for the Chroma Keying to work properly. Another problem is that the environment must be carefully planned so that the person or object does not have any of the solid color (e.g., green) on them, such as a shirt or tie, otherwise the software mistakenly detects the color as something to replace, resulting in strange artifacts of a background image appearing on the person or object.

A similar technique that does not require a solid color background may remove background objects based on a tracked user being specified by their skeletal recognition. In particular, this technique uses various image processing techniques to select and track a single person as the foreground, and remove the rest of the background from the scene. Notably, however, this technique currently does not allow for multiple people to be set as the foreground, nor does it allow for any non-human objects to be considered as the foreground (or a part thereof). Also, this technique requires a stagnant background (e.g., the tracked person should stand in a relatively uncluttered space, avoid standing in front of a very dark background or very bright light source pointing towards a sensor, and avoid holding a large reflective item), and the person or object cannot leave the frame.

An advanced technique herein addresses these problems, allowing a person or object can be filmed in any environment, while allowing for the separation of the person or object from its surrounding background in real-time, regardless of the background in use, and while allowing them to exit and re-enter the frame. In particular, certain embodiments herein can be configured to visually capture a person and/or object from a video scene based on depth, and isolate the captured portion of the scene from the background in real-time.

Figure 12A:
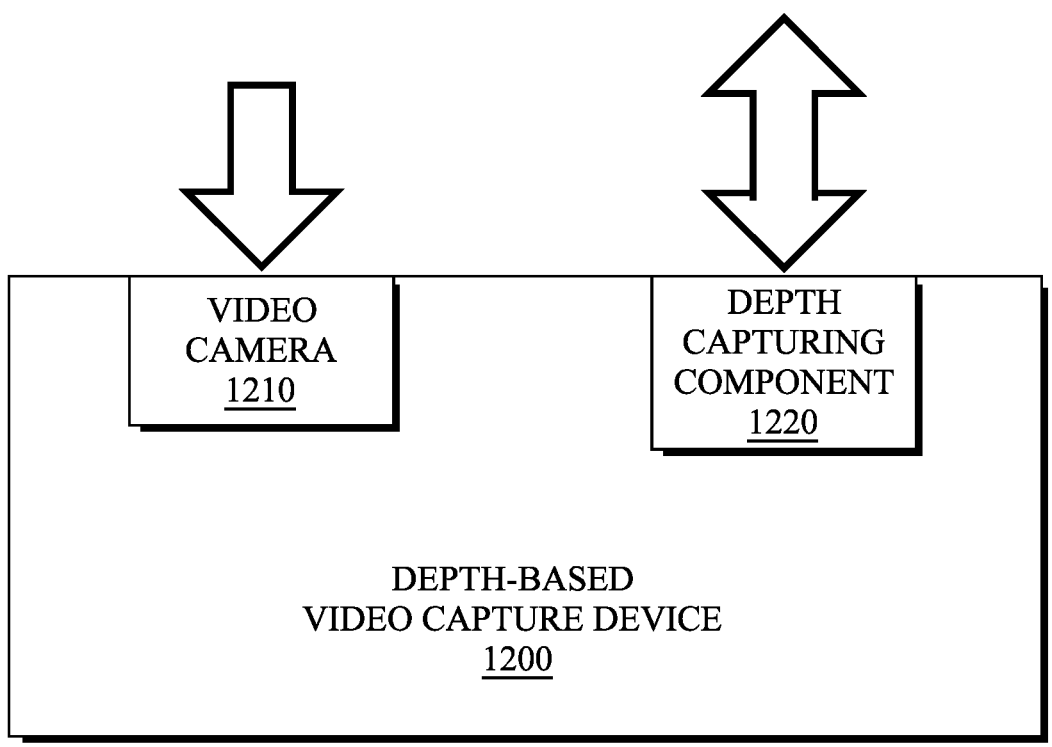
FIGS. 12A-12B illustrate examples of a depth-based video capture device.

In order to accomplish depth-based keying in this manner, a video capture device used herein may comprise a camera that is capable of detecting object distance. One such example camera that is commercially available is the KINECT camera, available from MICROSOFT. Illustratively, as shown in FIG. 12A, a depth-based video capture device 1200 may comprise two primary components, namely a video camera 1210 and a depth-capturing component 1220. For example, the video camera 1210 may comprise a "red, green, blue" (RGB) camera (also called a color video graphics array (VGA) camera), and may be any suitable rate (e.g., 30 or 60 frames per second (fps)) and any suitable resolution (e.g., 640×480 or greater, such as "high definition" resolutions, e.g., 1080p, 4K, etc.).

Figure 12B:
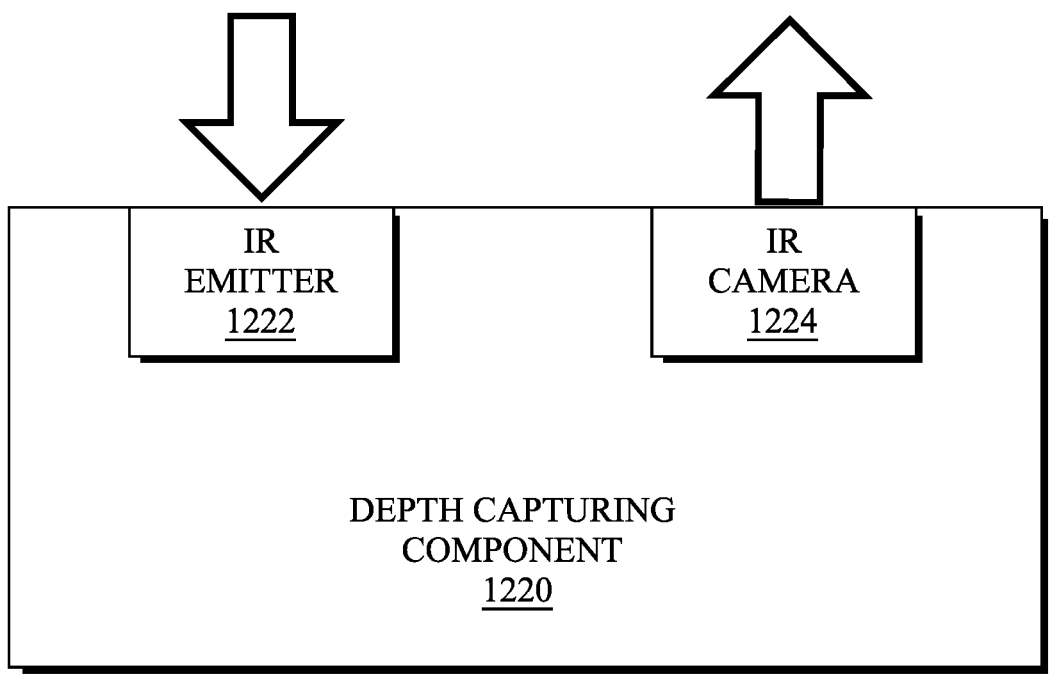

The depth capturing component 1220 may comprise two separate lenses, as illustrated in FIG. 12B, such as an infrared (IR) emitter 1222 to bathe the capture space in IR light, and an IR camera 1224 that receives the IR light from the IR emitter as it is reflected off of the objects within the capture space. For instance, the brighter the detected IR light, the closer the object is to the camera. One specific example of an IR camera is a monochrome CMOS (complementary metal-oxide semiconductor) sensor. Notably, the IR camera 1224 (or depth capturing component 1220, generally) may, though need not, have the same frame rate and resolution as the video camera 1210 (e.g., 30 fps and 640×480 resolution). Note also that while the video camera 1210 and depth capturing component 1220 are shown as an integrated device, the two components may be separately located (including separately locating the illustrative IR emitter 1222 and IR camera 1224), so long as there is sufficient calibration to collaboratively determine portions of the video image based on depth between the separately located components.

Figure 13A:
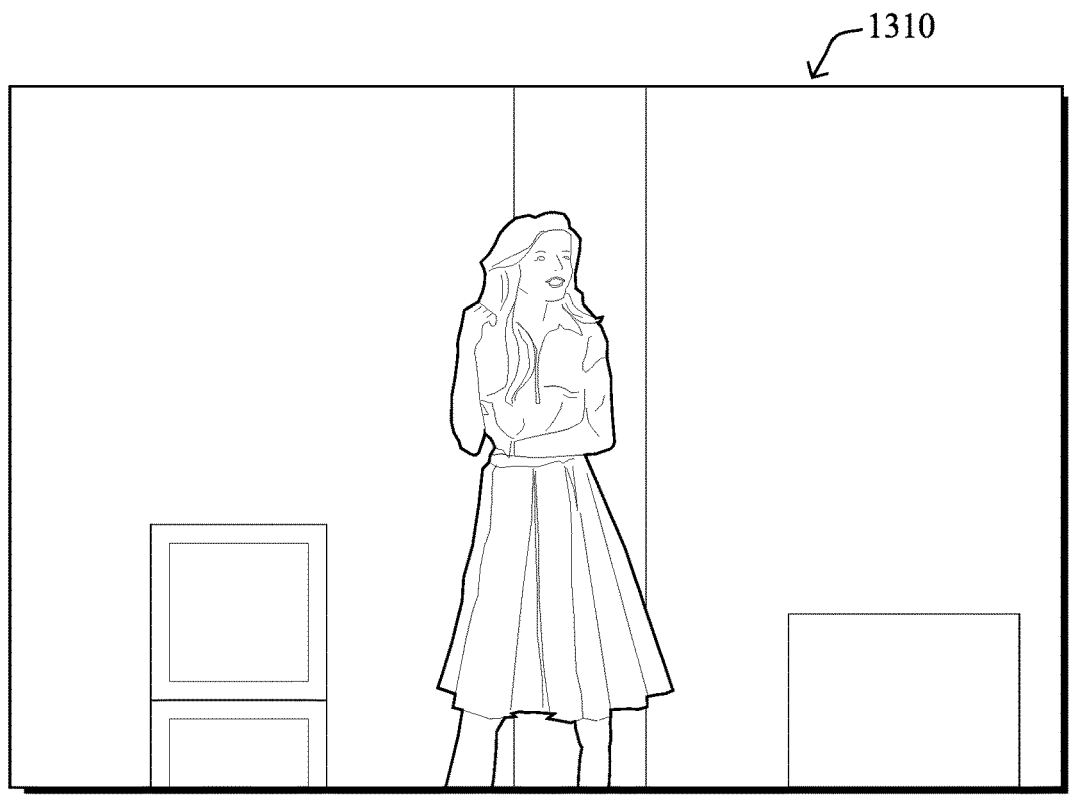
FIGS. 13A-13D illustrate an example of depth-based video capture.
Figure 13B:
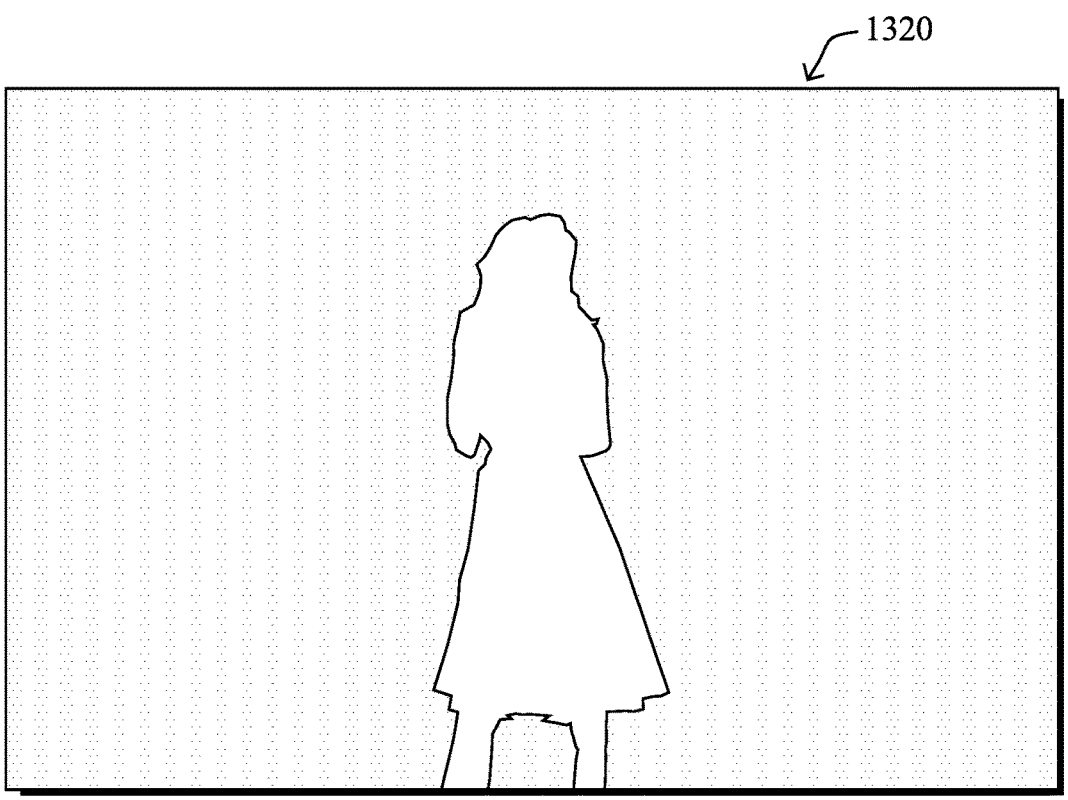

Based on inputting the images from the camera (e.g., a source A/V component) into the broadcasting computing device, a corresponding depth key compositing process enables setting/defining a desired depth range (e.g., manually via a user interface, or dynamically by the process itself) using the captured depth information (e.g., IR information). For example, FIG. 13A illustrates an example source image 1310 that may be captured by the video camera 1210. Conversely, FIG. 13B illustrates an example depth-based image 1320 that may be captured by the depth capturing component 1220, such as the IR image captured by the IR camera 1224 based on reflected IR light from the IR emitter 1222. In particular, the image 1320 in FIG. 13B may be limited (manually or dynamically) to only show the desired depth range of a given subject (person, object, etc.), such as based on the intensity of the IR reflection off the objects.

Figure 13C:
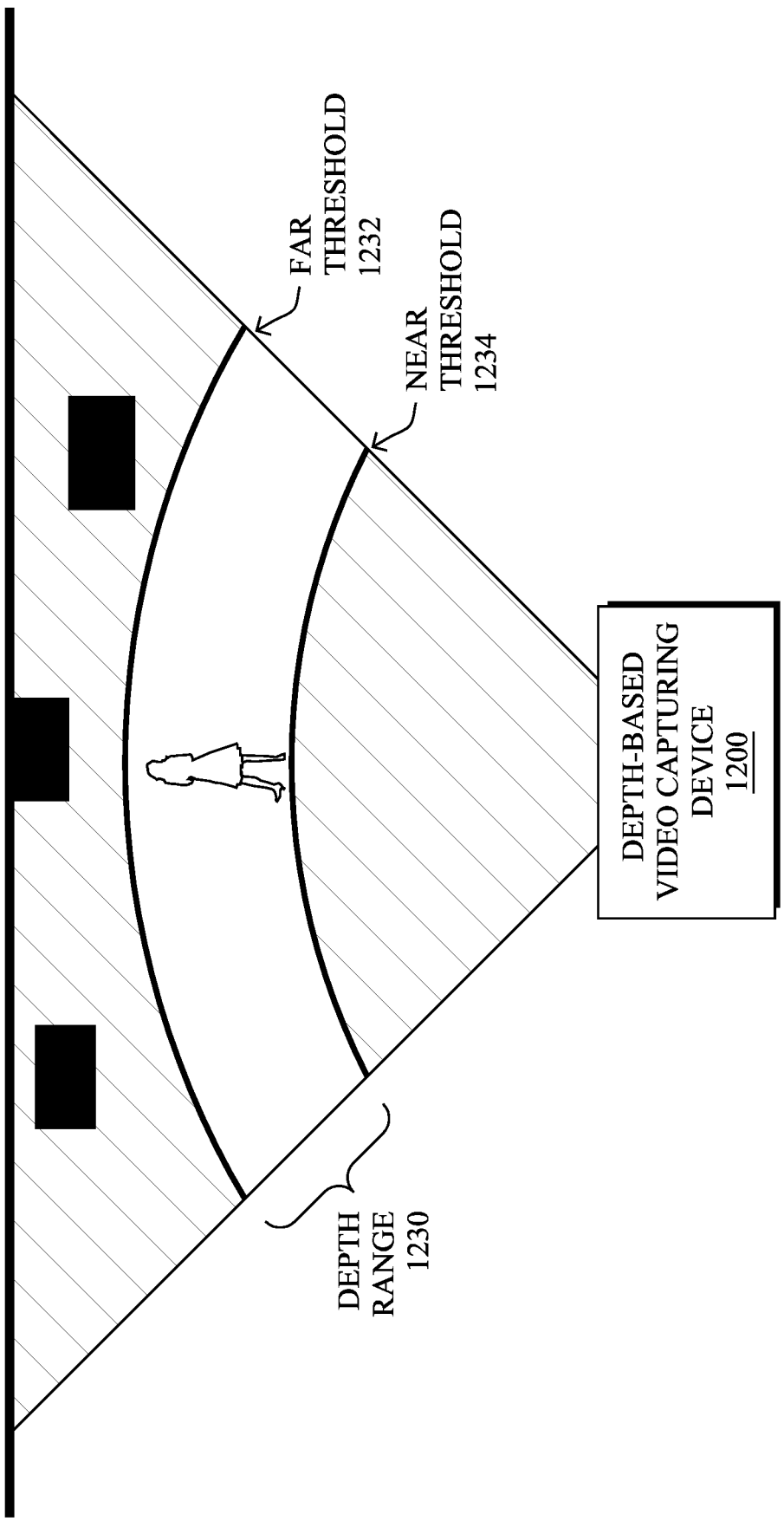

According to one or more embodiments herein, the depth range selected to produce the image 1320 in FIG. 13B may be adjusted on-the-fly (e.g., manually by a technician or dynamically based on object detection technology) in order to control what can be "seen" by the camera. For instance, the techniques herein thus enable object tracking during live events, such as individual performers move around a stage. For example, as shown in FIG. 13C, an aerial view of the illustrative scene is shown, where the desired depth range 1330 may be set by a "near" depth threshold 1334 and a "far" depth threshold 1332. As an example, a user may be prompted to press the '−' or '+' keys on a keyboard to decrease and increase the near threshold, respectively, and the '<' or '>' keys to correspondingly decrease and increase the far threshold, respectively. Other techniques (and particularly user inputs/keys) may be made available, such as defining a center depth (distance from camera) and then a depth of the distance captured surrounding that center depth, or defining a near or far depth threshold and then a further or nearer depth (in relation to the near or far depth threshold), respectively. This can also be combined with other body tracking algorithms (e.g., as described below).

Figure 13D:
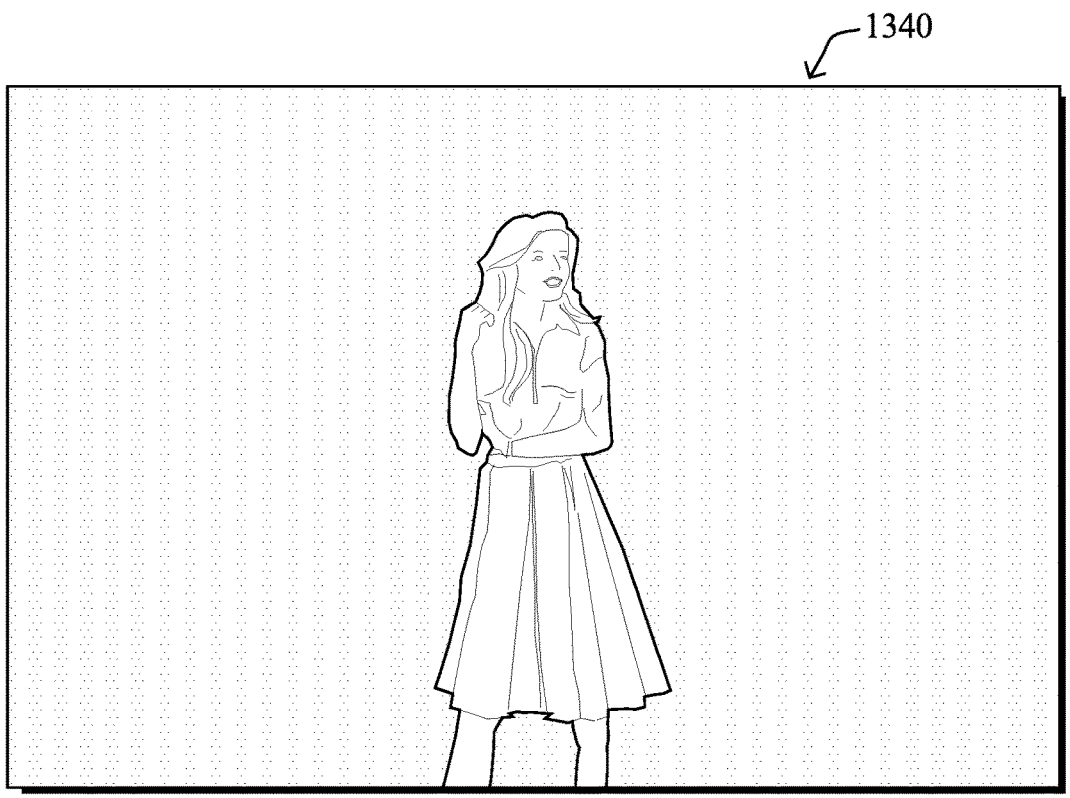

By then overlaying the depth information (IR camera information) of image 1320 in FIG. 13B with the video image 1310 from FIG. 13A, the techniques herein "cut out" anything that is not within a desired depth range, thus allowing the camera to "see" (display) whatever is within the set range, as illustrated by the resultant image 1340 in FIG. 13D. In this manner, the background image may be removed, isolating the desired person/object from the remainder of the visual scene captured by the video camera 1210. (Note that foreground images may also thus be removed, such as for various visual effects other than those specifically mentioned herein.)

By maintaining a consistent depth range 1330, a mobile object or person may enter or exit the depth range, thus appearing and disappearing from view. At the same time, however, by allowing for the dynamic and real-time adjustment of the depth range as mentioned above, a mobile object or person may be "tracked" as it moves in order to maintain within the depth range, accordingly.

Notably, in one embodiment as mentioned above, body tracking algorithms, such as skeletal tracking algorithms, may be utilized to track a person's depth as the person moves around the field of view of the cameras. For example, in one embodiment, the perspective (relative size) of the skeletally tracked individual(s) (once focused on that particular individual within the desired depth range) may result in corresponding changes to the depth range: for instance, a decrease in size implies movement away from the camera, and thus a corresponding increase in focus depth, while an increase in size implies movement toward the camera, and thus a corresponding decrease in focus depth. Other skeletal techniques may also be used, such as simply increasing or decreasing the depth (e.g., scanning the focus depth toward or away from the camera) or by increasing the overall size of the depth range (e.g., moving one or both of the near and far depth thresholds in a manner that widens the depth range).

In an alternative embodiment, if body tracking is enabled, the set depth range may remain the same, but a person's body that leaves that depth range may still be tracked, and isolated from the remaining scene outside of the depth range. For instance, body tracking algorithms may be used to ensure a person remains "captured" even if they step out of the specified depth range, allowing for certain objects to be left in the depth range for capture while a person has the freedom to move out of the depth range and still be captured. As an example, assume in FIG. 13C that there was an object, such as a chair, within the specified depth range 1330. If the person were to step out of the depth range 1330 while body tracking in this embodiment was enabled, the chair would remain in the isolated portion of the scene, as well as the person's body, regardless of where he or she moved within the captured image space. On the contrary, in the embodiment above where the body tracking adjusts the depth range, the chair may come into "view" of the dynamically adjusted depth range 1330 and become part of the isolated image only when the person moves to a depth corresponding to the chair.

Accordingly, with either type of body tracking enabled, an operator would not need to manually adjust the min/max depth to retain performers in a scene. For example, once the depth range is set, if body tracking is enabled and a person moves out of the depth range, they will still be tracked and included within the cut-out footage, whether by dynamically adjusting the depth range, or else by specifically following the person's body throughout the captured scene. (Note that the manual depth adjustments or "sliders" to set the near and far thresholds may remain available for including non-body objects in the scene.)

In accordance with one or more additional embodiments described herein, other filtering features may further adjust the area of the resultant image 1340, such as by managing a Gaussian function, a "disc blur" effect, or other techniques to smooth and/or sharpen the edges of the area isolated from the video image 1310. Other advanced techniques are also possible, such as skeletal tracking algorithms, which will enable a better picture and closer cutout of an individual in the desired depth range. By adding the ability to soften and blur the edges of the cut-out images, displaying (or overlaying) the depth-isolated image has edges that look smooth/ realistic.

Figure 14:
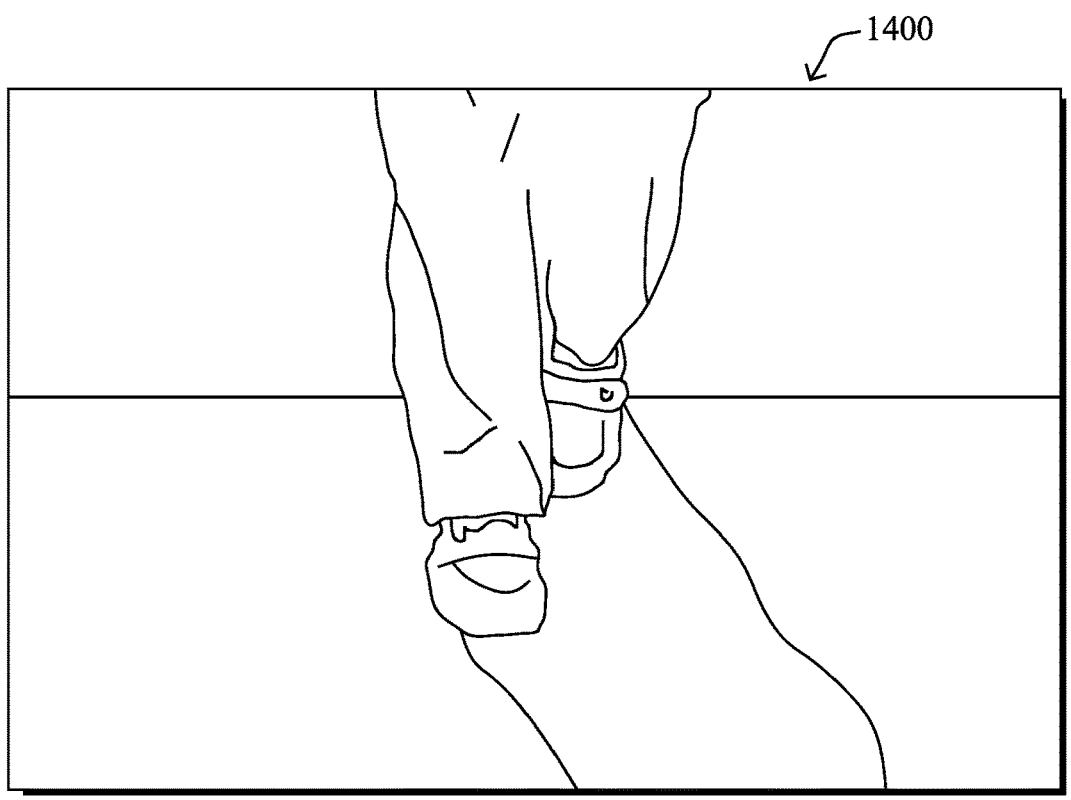
FIG. 14 illustrates an example of enhanced image processing.

Additional image processing features are also made available by the techniques herein, in order to provide greater functionality. For instance, in one embodiment, the video camera 1210 and IR camera 1224 (e.g., and optionally IR emitter 1222 or else the entire depth capturing component 1220) may be rotated vertically to achieve greater resolution when filming a standing person (e.g., such that the aspect ratio of the cameras is oriented in a vertically extended manner), for example, when objects to either side of the standing person are not required. Accordingly, in this embodiment, the final cut-out image may be rotated (e.g., 90 degrees) so the person/object is in the correct orientation when projected/overlayed in its final display application (e.g., described below). In addition, in another embodiment, the cut-out image can be flipped (e.g., horizontally and/or vertically) to display correctly (for example, when filming a guitarist, the displayed image may need to be flipped to show the guitarist playing on the correct handed guitar, depending upon the method of display, e.g., projection, reflection, digital processing, etc.). Still further, in one embodiment, the cut-out image may be resized to make the person/object a realistic size when it's displayed (e.g., bigger or smaller, wider or thinner, taller or shorter). Moreover, in yet another embodiment, post-processing techniques may be used to add scenes around the cut-out image, such as making the final result a "full-screen" image (e.g., a cut-out person standing in a generated or separately filmed background scene, etc.). For instance, in one specific example, a "floor" may be input beneath a person/object and shadows may be added on the floor (e.g., moving or stationary) to create a more realistic visual effect (particularly for holographic images), such as what is shown in FIG. 14.

Figure 15:
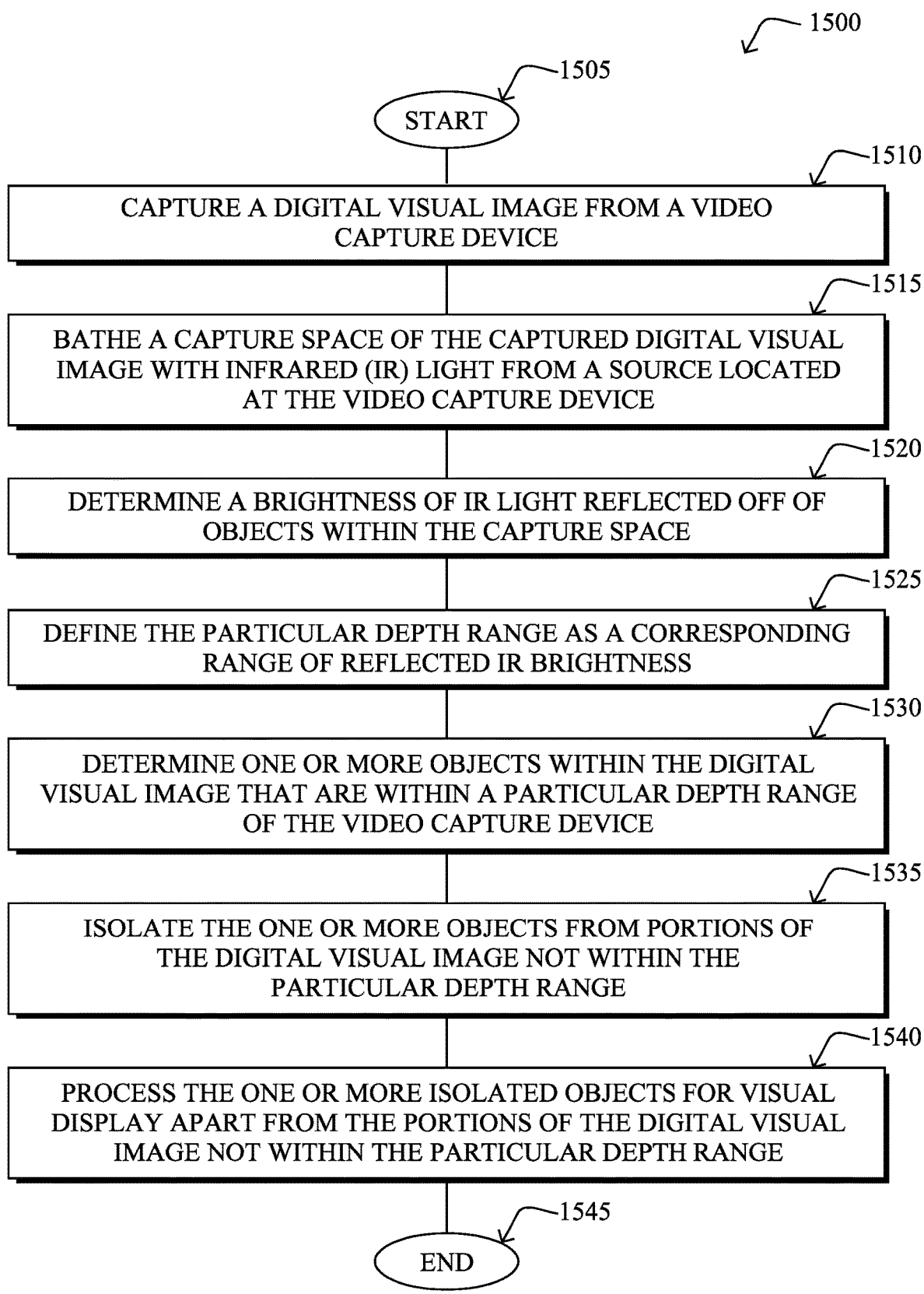
FIG. 15 illustrates an example simplified procedure for depth key compositing.

With general reference to the techniques described above, FIG. 15 illustrates an example simplified procedure for depth key compositing in accordance with one or more embodiments described herein. The procedure 1500 may start at step 1505, and continues to step 1510, where, as described in greater detail above, a digital visual image is captured from a video capture device. Illustratively, in one embodiment, in step 1515 a capture space of the captured digital visual image may be bathed with infrared (IR) light from a source located at the video capture device (e.g., integrated with the video capture device), and in step 1520 a brightness of IR light reflected off of objects within the capture space in order to define the particular depth range as a corresponding range of reflected IR brightness in step 1525 (e.g., manually adjusting with distance thresholds and/or dynamically adjusting with object tracking algorithms).

In step 1530, one or more objects within the digital visual image are determined that are within a particular depth range of the video capture device. In one specific embodiment, determining the one or more objects within the digital visual image that are within the particular depth range of the video capture device is based on the one or more objects having a particular reflected IR brightness within the corresponding range of reflected IR brightness of the particular depth range.

In step 1535, the one or more objects may be isolated from portions of the digital visual image not within the particular depth range, and the one or more isolated objects may be processed in step 1540 for visual display apart from the portions of the digital visual image not within the particular depth range. For example, as noted above, such processing may comprise applying image filtering, rotating, flipping, re-sizing, adding other images around the one or more isolated objects, preparing the one or more isolated objects for holographic displays, and so on.

The simplified procedure 1500 ends in step 1545, notably with the option to continue to capture images, isolate objects, track objects, adjust depth ranges, etc. Also, the processing in step 1540 may continue, such as storing the isolated (and processed) images, displaying the isolated images, streaming the isolated images, and so on, such as for film production and/or holographic displays.

It should be noted that while certain steps within procedure 1500 may be optional as described above, the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Figure 16:
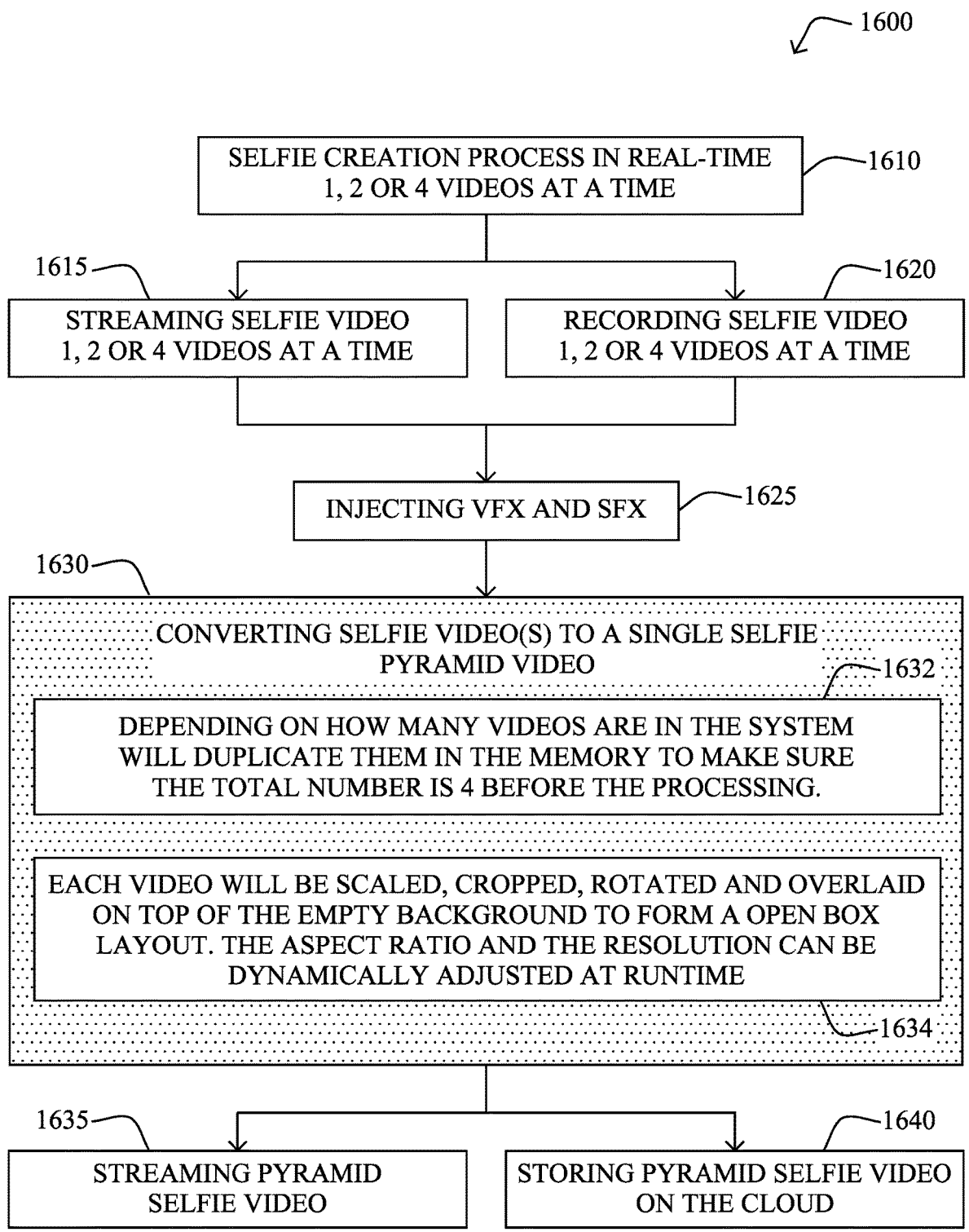
FIG. 16 illustrates an example simplified procedure for real-time video processing for pyramid holographic projections.

Returning specifically to the pyramid holographic projection embodiments herein, the "hologram selfie" technology above (removing the user or other object from its background for display as a clean hologram) may be specifically paired with the pyramid hologram production techniques above. In particular, and with reference to the procedure 1600 outlined in FIG. 16, the selfie creation process (e.g., depth-keying video capture of a subject) may capture one or more (e.g., 1, 2, or 4) videos at a time in step 1610. Depending on the purpose of the video, the procedure may either stream the selfie video in step 1615, or else may record/store the video in step 1620. Visual effects (VFX) and/or special effects (SFX) may optionally be injected in step 1625 prior to converting the selfie video into a single selfie pyramid video in step 1630. In particular, as described in detail above, step 1630 may comprise duplicating the video to the number needed for the pyramid (e.g., ensuring four copies for a four-sided pyramid) in sub-step 1632, and also scaling, cropping, and rotating the video images, and overlaying them on top of an empty background to form an open box layout (e.g., also adjusted for aspect ratio, resolution, etc., at runtime) in sub-step 1634. Then, in steps 1635 or 1640, the pyramid selfie video may be streamed or stored (e.g., on the cloud or otherwise), respectively.

Figure 17:
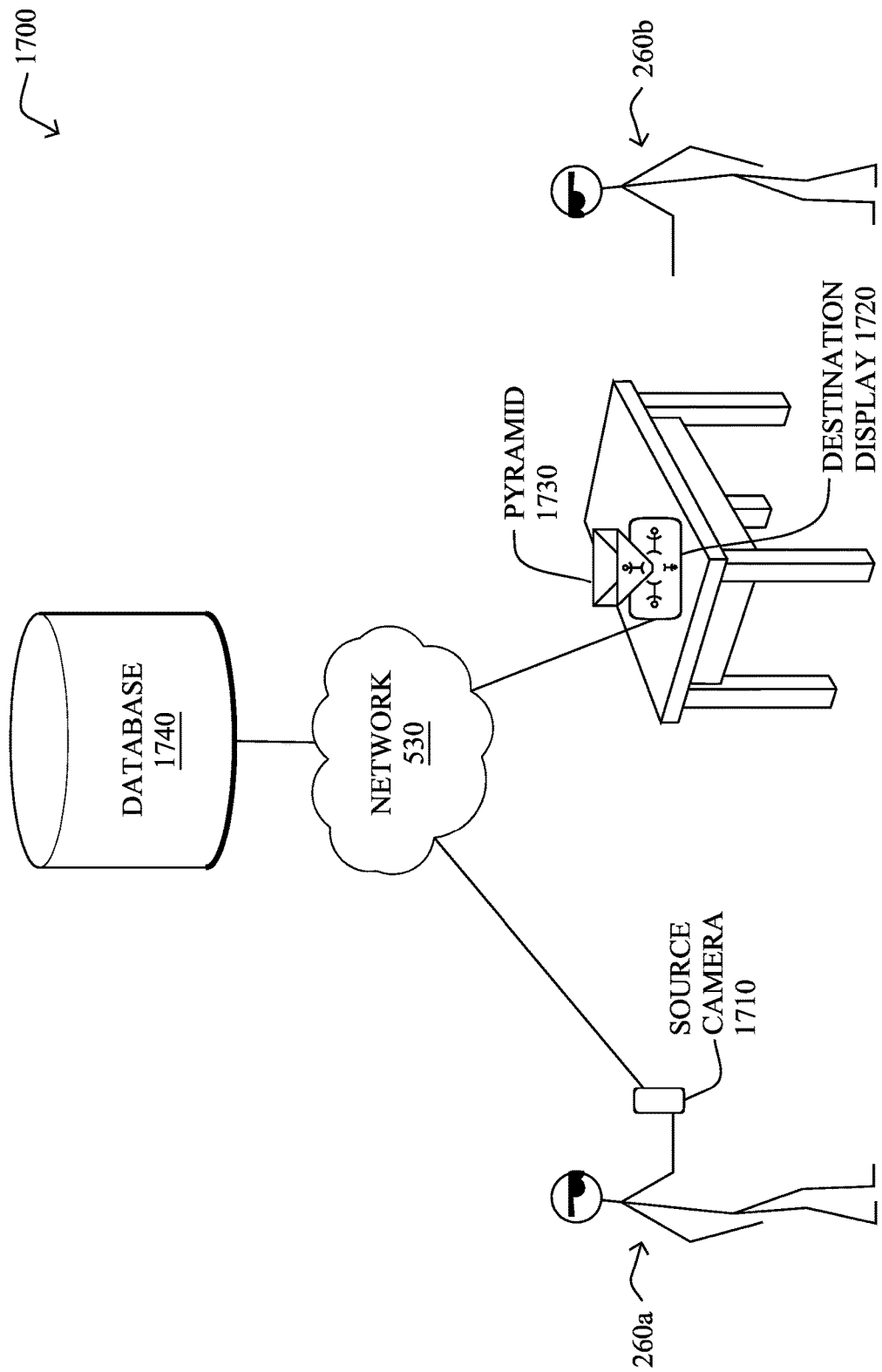
FIG. 17 illustrates an example of a pyramid hologram selfie environment.

For example, as shown in FIG. 17, the techniques herein may be used for personal communication (e.g., selfie holographic video chat, telepresence, etc.), whether real-time/live or pre-prerecorded (and stored locally with the case, or accessed from a networked database). For example, in a communication system 1700, a source user 260*a* may have a corresponding source camera device 1710, such as a smartphone, tablet, specifically designed device (e.g., with depth sensing technology), free-standing camera, and so on. The source images may be captured, and communicated through a network 530 to the destination display device 1720 (e.g., tablet, phone, etc.). By processing the captured image (e.g., on the source device, within the network, or at the destination device), the resultant pyramid image may be displayed on the pyramid holographic projection device 1730 to one or more receiving users 260*b* as shown. Note that in the case of stored images/video (e.g., selfie messages, avatar recordings, stored character animations, etc.) database 1740 may receive, store, and later transmit the desired images/video from the source camera 1710, accordingly.

Note that in one specific embodiment, a travel case for a portable pyramid holographic projection setup may be used as described herein that provides a road case that folds out into a pyramid holographic projection system, allowing for extended portability of larger (larger than smartphone or tablet) communication system endpoints. Specifically, in one embodiment, the portable case may be built for air travel, which currently must meet the weight and dimension restrictions of being less than 50 pounds and less than or equal to 62 linear inches total in height, width, and length (H+W+L) (i.e., the current baggage restriction for normal checked luggage for many major airlines). The setup herein, in particular, illustratively uses a video panel display and defines space-saving designs for legs, a folding or assembleable holographic pyramid and frame, as well as for other components (e.g., remotes, wires, etc.).

For example, with reference to FIG. 18, a travel case 1800 is shown, particularly where the outside 1810 of the travel case is shown from various angles, and generally may comprise a handle 1820, various latches 1830, and so on. In one embodiment, the outside of the travel case 1810 may be built in a manner similar to road cases for musicians and/or audio/video equipment, as will be appreciated by those skilled in the art, e.g., where the corners are reinforced with metal, the latches are recessed into the case, etc.

Figure 19A:
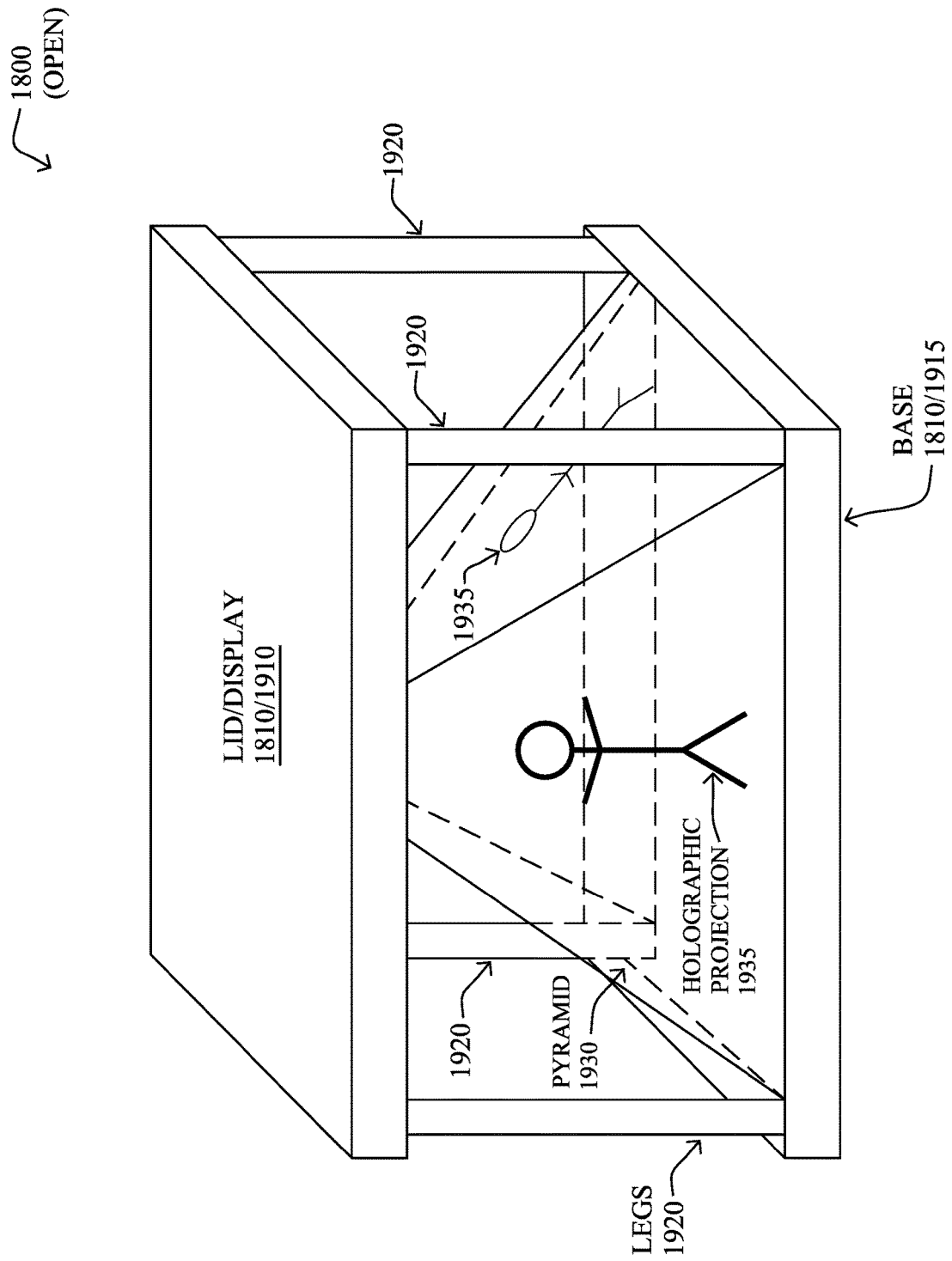
FIGS. 19A-19B illustrate an example of an opened travel case for pyramid holographic projections.
Figure 19B:
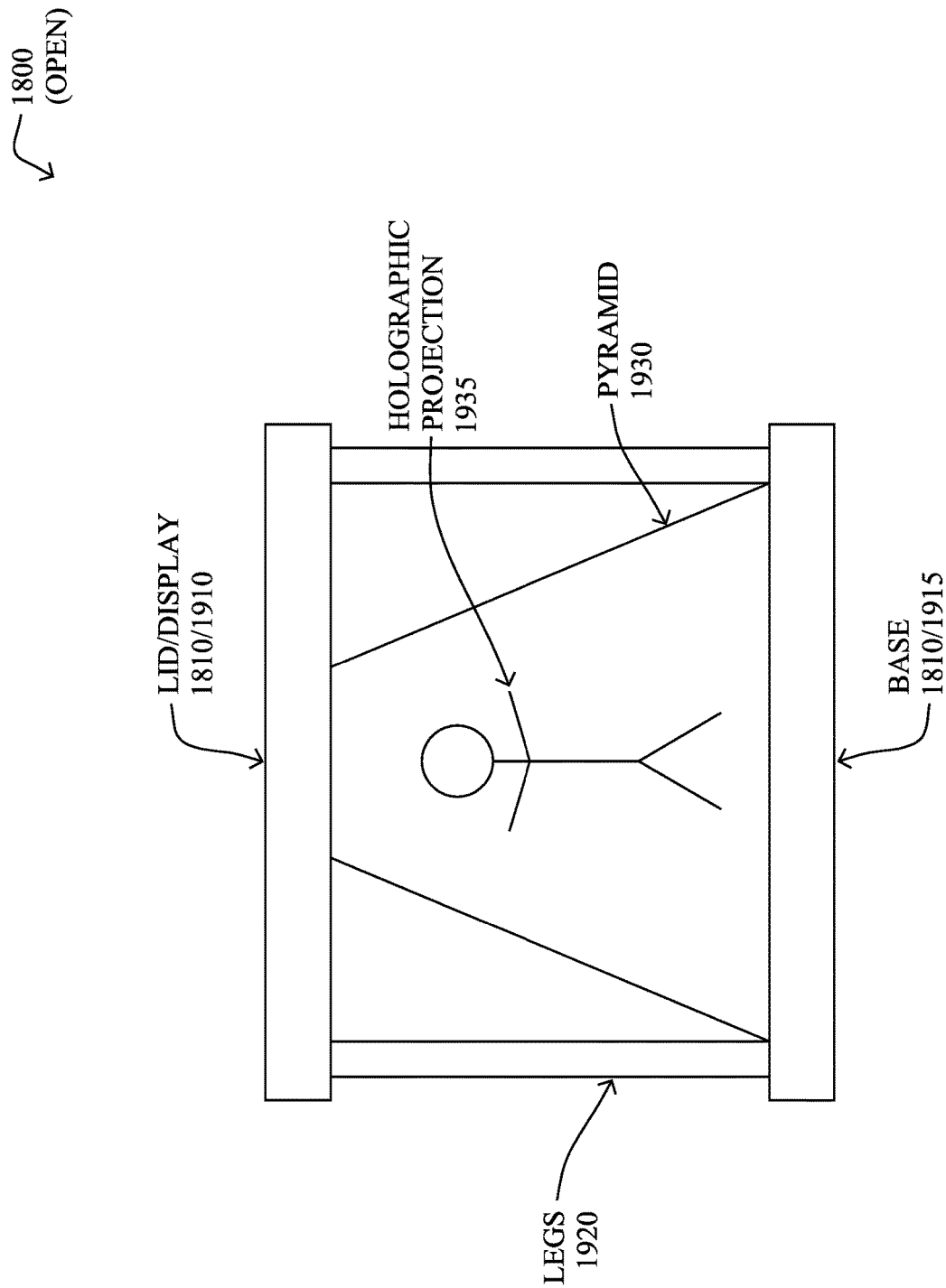

As shown in FIGS. 19A-19B, when opened, the travel case 1800 provides for a portable pyramid holographic projection setup. In particular, a video panel display (e.g., LED, LCD, etc.) may be mounted to the top half ("lid") of the case 1810/1910, and provides the image source for the pyramid holographic image 1935 that is reflected off the pyramid holographic projection screen/surfaces 1930. In addition, the lid of the case 1810/1910 may have a supporting bracket that holds the pyramid holographic projection surfaces 1930 (e.g., separate sheets of plastic, glass, etc. converging to a support, not shown), each on the illustrative 45-degree angle to the image source (extending angularly away from the image source). (Note that a base 1810/1915 or leg assembly 1920 may be provided for the bottom of the holographic screen 1930 as well for greater support, though the pyramid may rest on the floor or may free-hang from the lid.) The bottom half ("base") of the case 1810/1915 may be used as a stage or floor for the system, or else may be simply placed aside until the system is repacked. Alternatively, foam packing material (as described below) may also be used as a stage for the system. Note that though the travel case is shown with the display on the top/lid, a reverse configuration may also be used herein (i.e., the display on the bottom/based, with the pyramid facing the other direction, accordingly).

Various alternative applications of the techniques herein are also specifically contemplated herein. For example, the pyramid holographic projection herein may be applied to a variety of environments, whether for film production, live streaming, simulcasts, or pre-recorded applications. For instance, with reference again to FIG. 5, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

By streaming the video image of the performer as a video and projecting it onto a holographic projection system, a true concert or nightclub experience can be transmitted across the globe for the live entertainment experience. For example, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

For example, once the desired image is obtained from the techniques above, the desired image may be imported into an encoding software that allows for live streaming of video, while the accompanying audio may be brought into the computer and program separately. In one embodiment, the video/audio transmission may be directly to the remote/satellite computer, or else may be uploaded to a secure webpage first, and then downloaded from the remote site(s), such as by opening this webpage on a secure computer at the satellite venues.

In addition to concerts and nightclubs, the techniques herein may also be used for retail spaces, movie special effects, tradeshows, movie theater lobbies, conferences, speeches, retail window displays, personal appearances, and so on.

According to one or more embodiments described herein, therefore, the techniques herein provide for real-time video processing for pyramid holographic projections by:

obtaining one or more rectangular input images;

determining a geometry of a pyramid holographic projector;

cropping, by the process, the one or more rectangular input images into one or more corresponding trapezoidal input images with a flat planar UV map based on the geometry of the pyramid holographic projector; and producing, by the process, a pyramid holographic projection image source for projection on the pyramid holographic projector, the pyramid holographic projection image source stitching the one or more corresponding trapezoidal input images together on top of a transparent frame, wherein each of the one or more corresponding trapezoidal input images are positioned and rotated to form a shape corresponding to the geometry of the pyramid holographic projector, wherein the shape is centered in the transparent frame.

In addition, in certain embodiments, obtaining comprises one or more of real-time image capture or stored image retrieval.

In addition, in certain embodiments, the process further comprises copying one or more of the trapezoidal input images to be stitched and projected on more than one side of the pyramid holographic projector. In addition, in certain embodiments, a same trapezoidal input image is stitched and projected on all sides of the pyramid holographic projector.

In addition, in certain embodiments, obtaining comprises capturing a video selfie of a user. In addition, in certain embodiments, the process comprises separating an image of the user from a background environment (e.g., based on depth-keying or other separation technique selected from a group consisting of: chroma-keying; skeletal recognition; and the user being in front of a black background).

In addition, in certain embodiments, the one or more rectangular input images are selected from a group consisting of: a single image; a plurality of separate images; a video stream of images; and a plurality of video streams of images.

In addition, in certain embodiments, the one or more rectangular images are selected from a group consisting of: images of a user; images of an object; images of an avatar; and images of an animated character.

In addition, in certain embodiments, the process may further comprise performing one or more image processing techniques on one or both of the one or more rectangular input images or one or more corresponding trapezoidal input images.

In addition, in certain embodiments, one or more of determining, cropping, and producing are performed in real-time with the obtaining.

In addition, in certain embodiments, one or more of determining, cropping, and producing are performed during post-processing after obtaining and storing the one or more rectangular input images.

In addition, in certain embodiments, the process may comprise streaming the produced pyramid holographic projection image source for real-time projection on the pyramid holographic projector.

In addition, in certain embodiments, the process may comprise storing the produced pyramid holographic projection image source for playback projection on the pyramid holographic projector.

In addition, in certain embodiments, the geometry of a pyramid holographic projector is selected from a group consisting of: a three-sided pyramid; a four-sided pyramid; a three-sided pyramid with one side being a wall without a projected image; and a four-sided pyramid with one side being a wall without a projected image.

Advantageously, the techniques herein provide for real-time video processing for pyramid holographic projections for various applications, such as film, live streaming entertainment systems, and so on. In particular, as described above, the techniques herein provide the ability to create a real holographic selfie that can be streamed or played-back on any smartphone, tablet, or even bigger screens. In this manner, the techniques herein can be implemented for real-time holographic calls, holographic messaging, telepresence, and so on, where video images of a user are captured, converted to a specific video format, and played as a pyramid hologram.

In addition, for performance artists, live streaming an event to satellite locations, particularly holographically, is a great way to increase exposure while gaining an additional revenue stream without added cost. Moreover, receiving a holographic live stream at a venue may be at a fraction of the cost of paying the performance artist(s) to appear in person. Moreover, the ability to draw attention to displayed images, such as for marketing or consumer experience (e.g., sporting events, concierge services, shopping displays, etc.), is a key goal for many industries.

While there have been shown and described illustrative embodiments, it is to be understood that various other adaptations and modifications may be made within the spirit and scope of the embodiments herein. For example, the embodiments described herein may be used with holographic projection images produced from a variety of sources, such as live-streamed, pre-recorded, re-constructed, computer-generated, and so on. Also, any reference to "video" or "image" or "picture" need not limit the embodiments to whether they are motion or time-sequence photography or still images, and so on. (That is, while the embodiments have been generally described in terms of video capture, still pictures (stationary images) may also benefit from the techniques herein.) Furthermore, any multi-faceted holographic imagery device may be used herein, and the illustrations provided above are merely example embodiments, whether for four-sided pyramid objects (and corresponding images) or otherwise.

Moreover, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

Figure 20:
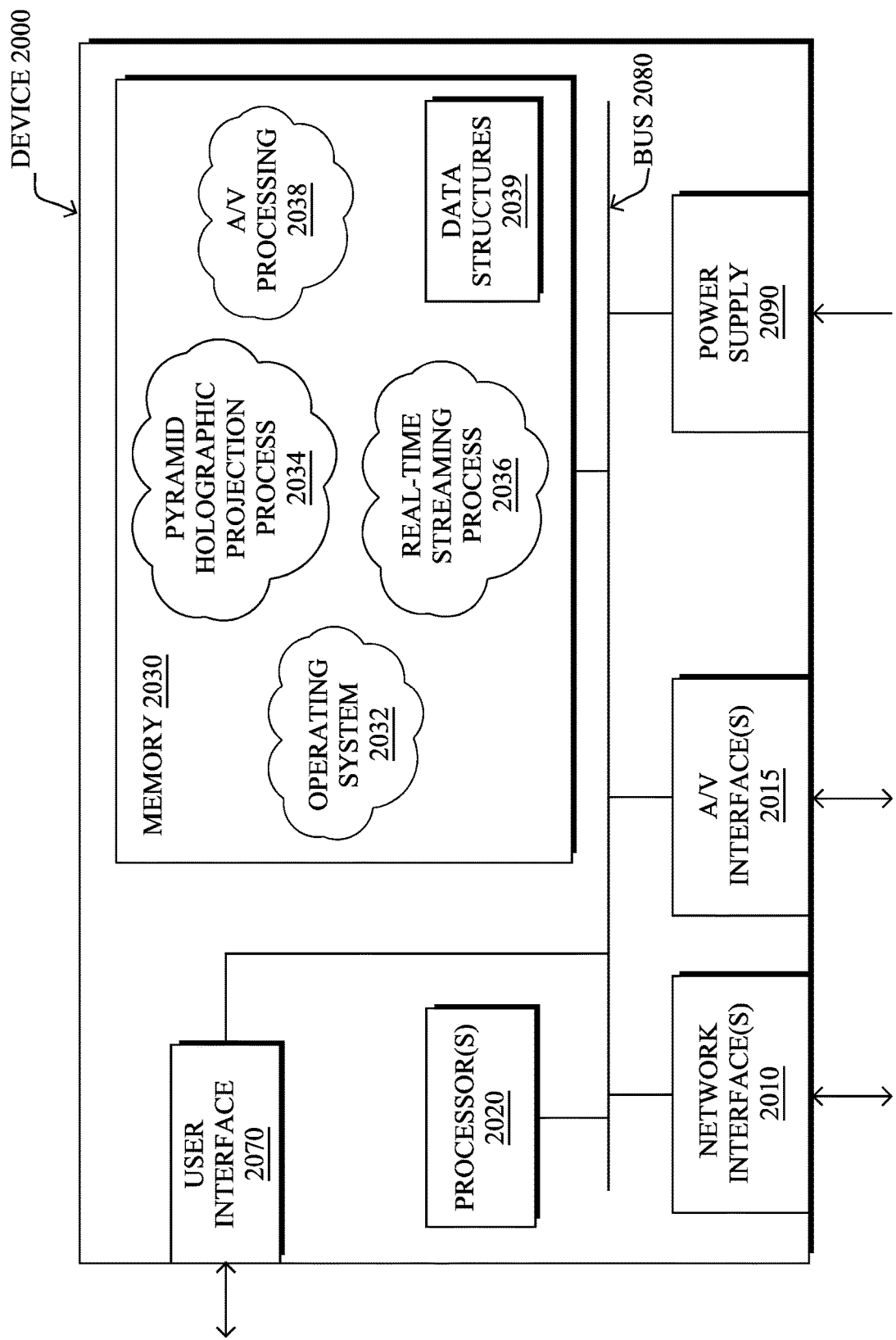
FIG. 20 illustrates an example simplified computing device.

For example, FIG. 20 is a schematic block diagram of an example computing device 2000 that may be used with one or more embodiments described herein. The illustrative device may comprise at least one network interface 2010, one or more audio/video (A/V) interfaces 2015, at least one processor 2020, a memory 2030, and user-interface components 2070 (e.g., keyboard, monitor, mouse, etc.), interconnected by a system bus 2080, as well as a power supply 2090. Other components may be added to the embodiments herein, and the components listed herein are merely illustrative.

The network interface(s) 2010 contain the mechanical, electrical, and signaling circuitry for communicating data over links coupled to a computer network. A/V interfaces 2015 contain the mechanical, electrical, and signaling circuitry for communicating data to/from one or more A/V devices, such as cameras, soundboards, lighting boards, display projectors, etc. The memory 2030 comprises a plurality of storage locations that are addressable by the processor 2020 for storing software programs and data structures associated with the embodiments described herein. The processor 2020 may comprise hardware elements or hardware logic adapted to execute the software programs and manipulate the data structures 2039. An operating system 2032, portions of which are typically resident in memory 2030 and executed by the processor, functionally organizes the machine by invoking operations in support of software processes and/or services executing on the machine. These software processes and/or services may comprise an illustrative pyramid holographic projection process 2034, a real-time streaming process 2036, and A/V processing process(es) 2038.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, certain aspects of the techniques described herein may be performed by hardware, software, and/or firmware, such as in accordance with the various processes and components described herein, which may contain computer executable instructions executed by the processor 2020 and/or associated hardware components to perform functions relating to the techniques described herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, by a process, one or more rectangular input images;
    determining, by the process, a geometry of a pyramid holographic projector;
    cropping, by the process, the one or more rectangular input images into one or more corresponding trapezoidal input images with a flat planar UV map based on the geometry of the pyramid holographic projector; and
    producing, by the process, a pyramid holographic projection image source for projection on the pyramid holographic projector, the pyramid holographic projection image source stitching the one or more corresponding trapezoidal input images together on top of a transparent frame, wherein each of the one or more corresponding trapezoidal input images are positioned and rotated to form a shape corresponding to the geometry of the pyramid holographic projector, wherein the shape is centered in the transparent frame.

2. The method as in claim 1, wherein obtaining comprises one or more of real-time image capture or stored image retrieval.

3. The method as in claim 1, further comprising:
    copying one or more of the trapezoidal input images to be stitched and projected on more than one side of the pyramid holographic projector.

4. The method as in claim 3, wherein a same trapezoidal input image is stitched and projected on all sides of the pyramid holographic projector.

5. The method as in claim 1, wherein obtaining comprises: capturing a video selfie of a user.

6. The method as in claim 5, further comprising:
    separating an image of the user from a background environment.

7. The method as in claim 6, wherein separating is based on depth-keying.

8. The method as in claim 6, wherein separating is based on a separation technique selected from a group consisting of: chroma-keying; skeletal recognition; and the user being in front of a black background.

9. The method as in claim 1, wherein the one or more rectangular input images are selected from a group consisting of: a single image; a plurality of separate images; a video stream of images; and a plurality of video streams of images.

10. The method as in claim 1, wherein the one or more rectangular images are selected from a group consisting of: images of a user; images of an object; images of an avatar; and images of an animated character.

11. The method as in claim 1, further comprising:
    performing one or more image processing techniques on one or both of the one or more rectangular input images or one or more corresponding trapezoidal input images.

12. The method as in claim 1, wherein one or more of determining, cropping, and producing are performed in real-time with the obtaining.

13. The method as in claim 1, wherein one or more of determining, cropping, and producing are performed during post-processing after obtaining and storing the one or more rectangular input images.

14. The method as in claim 1, further comprising:
    streaming the produced pyramid holographic projection image source for real-time projection on the pyramid holographic projector.

15. The method as in claim 1, further comprising:
    storing the produced pyramid holographic projection image source for playback projection on the pyramid holographic projector.

16. The method as in claim 1, wherein the geometry of a pyramid holographic projector is selected from a group consisting of: a three-sided pyramid; a four-sided pyramid; a three-sided pyramid with one side being a wall without a projected image; and a four-sided pyramid with one side being a wall without a projected image.

17. A tangible, non-transitory computer-readable media comprising instructions executable by a processor for executing a process comprising:
    obtaining one or more rectangular input images;
    determining a geometry of a pyramid holographic projector;
    cropping the one or more rectangular input images into one or more corresponding trapezoidal input images with a flat planar UV map based on the geometry of the pyramid holographic projector; and producing a pyramid holographic projection image source for projection on the pyramid holographic projector, the pyramid holographic projection image source stitching the one or more corresponding trapezoidal input images together on top of a transparent frame, wherein each of the one or more corresponding trapezoidal input images are positioned and rotated to form a shape corresponding to the geometry of the pyramid holographic projector, wherein the shape is centered in the transparent frame.

18. The computer-readable medium as in claim 17, wherein obtaining comprises one or more of real-time image capture or stored image retrieval, and wherein the process further comprises one of either:
streaming the produced pyramid holographic projection image source for real-time projection on the pyramid holographic projector; or
storing the produced pyramid holographic projection image source for playback projection on the pyramid holographic projector.

19. The computer-readable medium as in claim 17, wherein obtaining comprises:
capturing a video selfie of a user; and
separating an image of the user from a background environment.

20. The computer-readable medium as in claim 17, wherein one or more of determining, cropping, and producing are performed either in real-time with the obtaining or during post-processing after obtaining and storing the one or more rectangular input images.

* * * * *